United States Patent
LeTourneau

(10) Patent No.: US 11,100,137 B2
(45) Date of Patent: *Aug. 24, 2021

(54) METHOD AND/OR SYSTEM FOR TREE TRANSFORMATION

(71) Applicants: Robert T. Jenkins as Trustees of the Jenkins Family Trust Dated Feb. 8, 2002, Sacramento, CA (US); Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignees: Robert T. Jenkins, Sacramento, CA (US), as Trustees of the Jenkins Family Trust Dated Feb. 8, 2002.; Virginia T. Jenkins, Sacramento, CA (US), as Trustees of the Jenkins Family Trust Dated Feb. 8, 2002.

( * ) Notice: Subject to any disclaimer, the term of this patent is extended or adjusted under 35 U.S.C. 154(b) by 363 days.

This patent is subject to a terminal disclaimer.

(21) Appl. No.: 16/048,113

(22) Filed: Jul. 27, 2018

(65) Prior Publication Data

US 2019/0034510 A1    Jan. 31, 2019

Related U.S. Application Data

(63) Continuation of application No. 14/596,154, filed on Jan. 13, 2015, now Pat. No. 10,068,003, which is a continuation of application No. 14/086,741, filed on Nov. 21, 2013, now Pat. No. 9,015,202, which is a continuation of application No. 11/320,538, filed on Dec. 27, 2005, now Pat. No. 8,615,530.

(60) Provisional application No. 60/648,950, filed on Jan. 31, 2005.

(51) Int. Cl.
| | |
|---|---|
| *G06F 16/00* | (2019.01) |
| *G06F 16/28* | (2019.01) |
| *G06F 16/22* | (2019.01) |
| *G06F 16/901* | (2019.01) |
| *G06F 17/10* | (2006.01) |

(52) U.S. Cl.
CPC ........ *G06F 16/282* (2019.01); *G06F 16/2246* (2019.01); *G06F 16/9027* (2019.01); *G06F 17/10* (2013.01)

(58) Field of Classification Search
CPC ............... G06F 16/2246; G06F 16/282; G06F 16/9027; G06F 17/10
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |

(Continued)

OTHER PUBLICATIONS

U.S. Appl. No. 6/209,872, Application as Filed, filed Dec. 4, 2018, 129 pages.

(Continued)

*Primary Examiner* — Dinku W Gebresenbet
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed.

13 Claims, 24 Drawing Sheets

(56) References Cited

U.S. PATENT DOCUMENTS

| | | |
|---|---|---|
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,493,678 A | 2/1996 | Arcuri |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A * | 4/2000 | LeTourneau .............. G06F 9/44 |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,243,859 B1 | 6/2001 | Chen-Kuang |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,691,301 B2 | 2/2004 | Bowen |
| 6,714,939 B2 | 3/2004 | Saldanha et al. |
| 6,728,953 B1 | 4/2004 | Walster |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph |
| 6,965,990 B2 | 11/2005 | Barsness et al. |
| 6,968,330 B2 | 11/2005 | Edwards et al. |
| 6,978,271 B1 | 12/2005 | Hoffman |
| 7,043,555 B1 | 5/2006 | McClain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,190,376 B1 | 3/2007 | Tonisson |
| 7,191,182 B2 | 3/2007 | Anonsen et al. |
| 7,203,680 B2 | 4/2007 | Parida |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 | 9/2008 | Sarvazyan et al. |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B1 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,861,304 B1 | 12/2010 | Nachenberg |

(56) References Cited

U.S. PATENT DOCUMENTS

| | | |
|---|---|---|
| 7,882,147 B2 | 2/2011 | LeTourneau |
| 7,890,928 B2 | 2/2011 | Patrudu |
| 7,899,821 B1 | 3/2011 | Schiffmann |
| 8,020,145 B2 | 9/2011 | Fant |
| 8,032,860 B2 | 10/2011 | Piehler et al. |
| 8,037,102 B2 | 10/2011 | LeTourneau |
| 8,060,868 B2 | 11/2011 | Meijer et al. |
| 8,112,740 B2 | 2/2012 | Meijer et al. |
| 8,151,276 B2 | 4/2012 | Grechanik |
| 8,181,155 B2 | 5/2012 | Pinto et al. |
| 8,230,526 B2 | 7/2012 | Holland et al. |
| 8,250,526 B2 | 8/2012 | Anderson et al. |
| 8,316,059 B1 | 11/2012 | Schiffmann |
| 8,356,040 B2 | 1/2013 | LeTourneau |
| 8,365,137 B2 | 1/2013 | Fant |
| 8,438,534 B2 | 5/2013 | Thomson |
| 8,443,339 B2 | 5/2013 | LeTourneau |
| 8,484,236 B1 | 7/2013 | Andrews |
| 8,626,777 B2 | 1/2014 | LeTourneau |
| 8,650,201 B2 | 2/2014 | LeTourneau |
| 8,683,431 B2 | 3/2014 | Thomson et al. |
| 8,762,942 B2 | 6/2014 | Langworthy et al. |
| 8,869,106 B2 | 10/2014 | Jazdzewski |
| 8,990,769 B2 | 3/2015 | LeTourneau |
| 9,002,862 B2 | 4/2015 | Schiffmann |
| 9,020,961 B2 | 4/2015 | LeTourneau |
| 9,043,347 B2 | 5/2015 | LeTourneau |
| 9,077,515 B2 | 7/2015 | LeTourneau |
| 9,330,128 B2 | 5/2016 | Schiffmann |
| 9,411,841 B2 | 8/2016 | Schiffmann |
| 9,425,951 B2 | 8/2016 | LeTourneau |
| 9,430,512 B2 | 8/2016 | LeTourneau |
| 9,563,653 B2 | 2/2017 | LeTourneau |
| 9,646,034 B2 | 5/2017 | Schiffmann |
| 9,646,107 B2 | 5/2017 | LeTourneau |
| 9,842,130 B2 | 12/2017 | Schiffmann |
| 10,055,438 B2 | 8/2018 | Schiffmann |
| 10,068,003 B2 | 9/2018 | Schiffmann |
| 10,255,311 B2 | 4/2019 | LeTourneau |
| 2001/0003211 A1 | 6/2001 | Bera |
| 2001/0037496 A1 | 11/2001 | Simonyi |
| 2002/0062259 A1 | 2/2002 | Katz et al. |
| 2002/0040292 A1 | 4/2002 | Marcu |
| 2002/0059281 A1 | 5/2002 | Watanabe et al. |
| 2002/0091676 A1 | 7/2002 | Agrawal |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi |
| 2002/0133347 A1 | 9/2002 | Schoneburg |
| 2002/0133497 A1 | 9/2002 | Draper et al. |
| 2002/0149604 A1 | 10/2002 | Wilkinson |
| 2002/0169563 A1 | 11/2002 | de Carvalho Ferreira |
| 2002/0194163 A1 | 12/2002 | Hopeman |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236794 A1 | 12/2003 | Hostetter et al. |
| 2004/0010752 A1 | 1/2004 | Chan et al. |
| 2004/0019599 A1 | 1/2004 | Trappen |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad |
| 2004/0060007 A1 | 3/2004 | Gottlob et al. |
| 2004/0068498 A1 | 4/2004 | Patchet et al. |
| 2004/0075677 A1 | 4/2004 | Loyall et al. |
| 2004/0103105 A1 | 5/2004 | Lindblad et al. |
| 2004/0122844 A1 | 6/2004 | Malloy |
| 2004/0125124 A1 | 7/2004 | Kim |
| 2004/0160464 A1 | 8/2004 | Reyna |
| 2004/0205047 A1 | 10/2004 | Carpenter |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0267958 A1 | 12/2004 | Reed |
| 2004/0268236 A1 | 12/2004 | Childlovskii et al. |
| 2005/0021548 A1 | 1/2005 | Bohannon et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar |
| 2005/0050016 A1 | 3/2005 | Stanoi et al. |
| 2005/0050066 A1 | 3/2005 | Hughes |
| 2005/0058976 A1 | 3/2005 | Vernon |
| 2005/0060332 A1 | 3/2005 | Bernstein et al. |
| 2005/0065964 A1 | 3/2005 | Ziemann et al. |
| 2005/0097084 A1 | 5/2005 | Balmin |
| 2005/0125432 A1 | 6/2005 | Lin et al. |
| 2005/0138073 A1 | 6/2005 | Zhou et al. |
| 2005/0149471 A1 | 7/2005 | Lassalle |
| 2005/0154265 A1 | 7/2005 | Miro et al. |
| 2005/0154979 A1 | 7/2005 | Chidlovskii et al. |
| 2005/0156761 A1 | 7/2005 | Oh |
| 2005/0165732 A1 | 7/2005 | Burges |
| 2005/0171962 A1 | 8/2005 | Martin |
| 2005/0187900 A1 | 8/2005 | LeTourneau |
| 2005/0214727 A1 | 9/2005 | Stoianovici et al. |
| 2005/0216445 A1 | 9/2005 | Rao |
| 2005/0267908 A1 | 12/2005 | LeTourneau |
| 2005/0286788 A1 | 12/2005 | Orr |
| 2006/0004817 A1 | 1/2006 | Andrews |
| 2006/0005122 A1 | 1/2006 | Lemoine |
| 2006/0015538 A1 | 1/2006 | LeTourneau |
| 2006/0053122 A1 | 3/2006 | Korn et al. |
| 2006/0074838 A1 | 4/2006 | Srivastava |
| 2006/0095442 A1 | 5/2006 | LeTourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito et al. |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 10/2008 | Furusho |
| 2010/0094885 A1 | 4/2010 | LeTourneau |
| 2010/0094908 A1 | 4/2010 | LeTourneau |
| 2010/0114969 A1 | 5/2010 | LeTourneau |
| 2010/0191775 A1 | 7/2010 | Schiffmann et al. |
| 2010/0205581 A1 | 8/2010 | LeTourneau |
| 2012/0144388 A1 | 6/2012 | Schiffmann |
| 2016/0162528 A1 | 6/2016 | LeTourneau |
| 2021/0149860 A1 | 5/2021 | Letourneau |

OTHER PUBLICATIONS

U.S. Appl. No. 16/209,872: Notice to File Missing Parts, filed Dec. 28, 2018, 2 pages.
U.S. Appl. No. 16/209,872, filed Dec. 28, 2018, 3 pages.
U.S. Appl. No. 15/250,118: Terminal Disclaimer, filed Dec. 11, 2018, 4 pages.
U.S. Appl. No. 15/250,118: Notice of Allowance and Fees Due, dated Jan. 8, 2019, 32 pages.
U.S. Appl. No. 15/250,118: Amendment after Notice of Allowance, dated Jan. 23, 2019, 18 pages.
U.S. Appl. No. 12/830,236: After Final Consideration Program Decision, filed Nov. 18, 2018, 4 pages.
U.S. Appl. No. 14/641,735: Non-Final Rejection, dated Nov. 2, 2018, 28 pages.
U.S. Appl. No. 15/411,823: Issue Notification, filed Nov. 7, 2018, 1 page.
U.S. Appl. No. 16/164,430: Notice to File Missing Parts, filed Nov. 6, 2018, 2 pages.

(56) References Cited

OTHER PUBLICATIONS

U.S. Appl. No. 16/164,430, filed Nov. 6, 2018, 4 pages.
U.S. Appl. No. 16/164,430: Applicant Response to Pre-Exam Formalities Notice, filed Jan. 18, 2019, 29 pages.
U.S. Appl. No. 16/164,430, filed Jan. 23, 2019, 4 pages.
"Core Technology Benchmarks a White Paper", Jul. 2002, downloaded from the internet Mar. 2, 2004.
"Origin Data, Inc. White Paper", © 1999, pp. 1-13.
"The Associative Model of Data White Paper", Lazy Software, Ltd., 2000.
ACM Portal Search Results (Kleene and prime and enumeration and operation and natural and numerals and sequences and "enumeration operation") conducted by Examiner on Jul. 18, 2009, 6 pages.
ACM Portal Search Results (Kleene and prime and enumeration and operation and natural and numerals and sequences and enumeration and operation) conducted by Examiner on Jul. 18, 2009, 1 page.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime No. Theorem", Engineering and Science, No. 4, 1996.
Benedikt et al., "Definable Relations and First-Order Query Languages over Strings" Journal of the ACM, vol. 50, No. 5, pp. 694-751, 2003.
Boppana et al., "Full Fault Dictionary Storage Based on Labeled Tree Encoding", Proceedings of $14^{th}$ VLSI Test Symposium, 1996, pp. 174-179.
Borodin et al., "A Tradeoff Between Search and Update Time for the Implicit Dictionary Problem", Theoretical Computer Science vol. 1 No. 4 (1990), 425-447.
Cano et al., "Lazy Evaluation in Penniless Propagation over Join Trees", Networks, vol. 39(4), 2002 Wiley Periodicals, Inc., 175-185, 2002.
Caviness et al, "Simplification of Radical Expressions", ACM, pp. 329-338, 1976.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "*Oh! Pascal!*", 1982, W.W. Norton & Company, Inc., Chapter 12, Arrays for Random Access, pp. 295-327.
Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Ferragina et al., "The String B-Tree: A New Data Structure for String Search in External Memory and Its Applications", Journal of the ACM, vol. 46, No. 2, pp. 236-280, 1999.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hirschberg, "Algorithm for Computing Maximal Common Sebsequences", Communication of the ACM, vol. 18, No. 6, pp. 341-343, 1975.
Hoffman et al., "Pattern Matching in Trees", Purdue University, Jan. 1982, Journal for the Association for Computing Machinery, vol. 29, Issue 1, pp. 68-95.

Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Katajainen et al., "Tree Compression and Optimization with Applications", International Journal of Foundations of Computer Science, vol. 1 No. 4 (1990), 425-447.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A—Jun. 1992, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, voi. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the $12^{th}$ International Conference on Jun. 9-12, 1992, pp. 572-580.
Shanmugasundaram et al., "Querying SML Views of Relational Data", Proceedings of the $27^{th}$ VLDB Conference, Roma, Italy, 2001, 9 pages.
Siegel, "All Searches Are Divided into Three Parts String Searches Using Ternary Trees", ACM, pp. 57-68, 1988.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.

(56) References Cited

OTHER PUBLICATIONS

Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859, filed Dec. 6, 2004, 120 pages.
U.S. Appl. No. 11/005,859: Notice to File Missing parts filed Jan. 10, 2005, 2 pages.
U.S. Appl. No. 11/005,859: Response to Notice to File Missing parts filed Apr. 1, 2005, 9 pages.
U.S. Appl. No. 11/005,859: Preliminary Amendment filed Apr. 28, 2005, 193 pages.
U.S. Appl. No. 11/005,859: Office Action—Restriction Requirement dated Dec. 12, 2007, 7 pages.
U.S. Appl. No. 11/005,859: Response to Office Action—Restriction Requirement filed Jan. 14, 2008, 82 pages.
U.S. Appl. No. 11/005,859: Non-final Office Action dated Mar. 21, 2008, 10 pages.
U.S. Appl. No. 11/005,859: Amendment filed Jul. 21, 2008, 86 pages.
U.S. Appl. No. 11/005,859: Final Office Action dated Oct. 30, 2008, 14 pages.
U.S. Appl. No. 11/005,859: Amendment filed Dec. 30, 2008, 83 pages.
U.S. Appl. No. 11/005,859: Advisory Action dated Jan. 13, 2009, 4 pages.
U.S. Appl. No. 11/005,859: RCE with amendment filed Apr. 30, 2009, 86 pages.
U.S. Appl. No. 11/005,859: Final Office Action dated Jul. 8, 2009, 9 pages.
U.S. Appl. No. 11/005,859: Examiner Interview Summary, 3 pages.
U.S. Appl. No. 11/005,859: Amendment filed Dec. 8, 2009, 83 pages.
U.S. Appl. No. 11/005,859: Advisory Action dated Dec. 22, 2009, 3 pages.
U.S. Appl. No. 11/005,859: RCE with Amendment filed Jan. 7, 2010, 85 pages.
U.S. Appl. No. 11/005,859: Non-Final Office Action dated Jan. 21, 2010, 8 pages.
U.S. Appl. No. 11/005,859: Response to Non-Final Office Action filed Feb. 25, 2010, 83 pages.
U.S. Appl. No. 11/005,859: Final Office Action dated Jun. 8, 2010, 9 pages.
U.S. Appl. No. 11/005,859: Office Action Response dated Sep. 1, 2010, 89 pages.
U.S. Appl. No. 11/005,859: Advisory Action dated Sep. 14, 2010, 3 pages.
U.S. Appl. No. 11/005,859: Notice of Appeal filed Sep. 29, 2010, 1 page.
U.S. Appl. No. 11/005,859: Office Action dated Oct. 15, 2010, 5 pages.
U.S. Appl. No. 11/005,859: Office Action Response dated Jan. 18, 2011, 95 pages.
U.S. Appl. No. 11/005,859: Final Ofice Action dated Mar. 30, 2011, 7 pages.
U.S. Appl. No. 11/005,859: Notice of Allowance and Fees Due, dated Jun. 9, 2011, 11 pages.
U.S. Appl. No. 11/005,859: Amendment after Notie of Allowance and Issue Fee Payment, dated Sep. 9, 2011, 2 pages.
U.S. Appl. No. 11/005,859: Issue Notification, filed Sep. 21, 2011, 1 page.
U.S. Appl. No. 13/229,624, filed Sep. 9, 2011, 139 pages.
U.S. Appl. No. 13/229,624, filed Sep. 21, 2011, 4 pages.
U.S. Appl. No. 13/229,624: Non-Final Office Action, dated Nov. 23, 2011, 8 pages.
U.S. Appl. No. 13/229,624: Notice of Publication, filed Dec. 30, 2011, 1 page.
U.S. Appl. No. 13/229,624: Amendment, dated Feb. 23, 2012, 22 pages.
U.S. Appl. No. 13/229,624: Final Office Action, dated Mar. 20, 2012, 10 pages.
U.S. Appl. No. 13/229,624: Amendment after final, dated Jun. 13, 2012, 25 pages.
U.S. Appl. No. 13/229,624: Advisory Action, dated Jun. 20, 2012, 4 pages.
U.S. Appl. No. 13/229,624: RCE, filed Jul. 20, 2012, 26 pages.
U.S. Appl. No. 13/229,624: Non-Final Rejection, dated Oct. 2, 2013, 9 pages.
U.S. Appl. No. 13/229,624: Response to non-final office action, dated Dec. 27, 2013, 11 pages.
U.S. Appl. No. 13/229,624: Non-Final Office Action, dated Apr. 4, 2014, 5 Pages.
U.S. Appl. No. 13/229,624: Non-Final Office Action Response, dated Aug. 1, 2014, 9 Pages.
U.S. Appl. No. 13/229,624: Final Rejection. dated Oct. 30, 2014, 6 pages.
U.S. Appl. No. 13/229,624: Response and Amendments after Final, filed Jan. 30, 2015, 11 pages.
U.S. Appl. No. 13/229,624: Advisory Action, dated Mar. 11, 2015, 3 pages.
U.S. Appl. No. 13/229,624: Applicant Initiated Interview Summary, filed Mar. 19, 2015, 3 pages.
U.S. Appl. No. 13/229,624: Response After Final Action and Interview Summary, filed Mar. 27, 2015, 20 pages.
U.S. Appl. No. 13/229,624: RCE and Amendments, filed Apr. 27, 2015, 17 pages.
U.S. Appl. No. 13/229,624: Notice of Allowance and Fees, dated Jul. 6, 2015, 21 pages.
U.S. Appl. No. 13/229,624: Issue Fee Payment, filed Sep. 28, 2015, 1 page.
U.S. Appl. No. 13/229,624: Issue Notification, filed Oct. 14, 2015, 1 page.
U.S. Appl. No. 14/870,744, filed Sep. 30, 2015, 127 pages.
U.S. Appl. No. 14/870,744: Preliminary Amendments, dated Oct. 6, 2015, 10 pages.
U.S. Appl. No. 14/870,744: Notice to File Missing Parts, filed Oct. 16, 2015, 2 pages.
U.S. Appl. No. 14/870,744, filed Oct. 16, 2015, 3 pages.
U.S. Appl. No. 14/870,744: Applicant Response to Pre-Exam Formalities Notice, filed Feb. 19, 2016, 2 pages.
U.S. Appl. No. 14/870,744, filed Mar. 2, 2016, 3 pages.
U.S. Appl. No. 14/870,744: Notice of Publication, filed Jun. 9, 2016, 1 page.
U.S. Appl. No. 14/870,744: Non-Final Rejection, dated Aug. 24, 2017, 11 pages.
U.S. Appl. No. 14/870,744: Amendment/Req. Reconsideration—After Non-Final Reject, dated Nov. 24, 2017, 30 pages.
U.S. Appl. No. 14/870,744: Final Rejection, dated Mar. 30, 2018, 20 pages.
U.S. Appl. No. 14/870,744: Response After Final Action, dated May 30, 2018, 33 pages.
U.S. Appl. No. 14/870,744: Advisory Action, dated Jul. 3, 2018, 5 pages.

(56) References Cited

OTHER PUBLICATIONS

U.S. Appl. No. 14/870,744: RCE and Amendments, filed Jul. 27, 2018, 33 pages.
U.S. Appl. No. 14/870,744: Notice of Allowance and Fees Due, dated Sep. 6, 2018, 11 pages.
U.S. Appl. No. 11/007,139, filed Dec. 7, 2004, 90 pages.
U.S. Appl. No. 11/007,139: Notice to File Missing Parts filed Jan. 19, 2005, 2 pages.
U.S. Appl. No. 11/007,139: Response to Notice to File Missing Parts filed Apr. 1, 2005, 9 pages.
U.S. Appl. No. 11/007,139: Preliminary Amendment filed Apr. 28, 2005, 146 pages.
U.S. Appl. No. 11/007,139: Non-final Office Action dated May 14, 2007, 58 pages.
U.S. Appl. No. 11/007,139: Amendment filed Oct. 15, 2007, 32 pages.
U.S. Appl. No. 11/007,139: Supplemental Response filed Oct. 17, 2007, 7 pages.
U.S. Appl. No. 11/007,139: Non-final Office Action dated Jan. 2, 2008 with Examiner's search results, 21 pages.
U.S. Appl. No. 11/007,139: Amendment filed Apr. 2, 2008, 30 pages.
U.S. Appl. No. 11/007,139: Final Office Action dated May 15, 2008, 30 pages.
U.S. Appl. No. 11/007,139: Amendment filed Oct. 15, 2008, 26 pages.
U.S. Appl. No. 11/007,139: Advisory Action dated Oct. 22, 2008, 26 pages.
U.S. Appl. No. 11/007,139: RCE with Amendment filed Nov. 14, 2008, 32 pages.
U.S. Appl. No. 11/007,139: Non-final Office Actioin dated Dec. 8, 2008, 24 pages.
U.S. Appl. No. 11/007,139: Amendment filed May 8, 2009, 31 pages.
U.S. Appl. No. 11/007,139: Final Office Action dated Aug. 4, 2009, 26 pages.
U.S. Appl. No. 11/007,139: Amendment filed Dec. 4, 2009, 28 pages.
U.S. Appl. No. 11/007,139: Advisory Action dated Dec. 14, 2009, 4 pages.
U.S. Appl. No. 11/007,139: RCE with amendment filed Jan. 4, 2010, 27 pages.
U.S. Appl. No. 11/007,139: Non-Final Office Action dated Jan. 27, 2010, 31 pages.
U.S. Appl. No. 11/007,139: Response to Non-Final Office Action filed Apr. 27, 2010, 30 pages.
U.S. Appl. No. 11/007,139: Office Action dated Jul. 20, 2010, 20 pages.
U.S. Appl. No. 11/007,139: Office Action response dated Oct. 20, 2010, 33 pages.
U.S. Appl. No. 11/007,139: Advisory Action dated Oct. 25, 2010, 2 pages.
U.S. Appl. No. 11/007,139: Office Action response dated Nov. 18, 2010, 24 pages.
U.S. Appl. No. 11/007,139: Advisory Action dated Dec. 1, 2010, 4 pages.
U.S. Appl. No. 11/007,139: Office Action response and Notice of Appeal dated Dec. 20, 2010, 29 pages.
U.S. Appl. No. 11/007,139: Office Action dated Jan. 3, 2011, 24 pages.
U.S. Appl. No. 11/007,139: Office Action response, dated May 3, 2011, 27 pages.
U.S. Appl. No. 11/007,139: Final Office Action, dated Jul. 18, 2011, 23 pages.
U.S. Appl. No. 11/007,139: Amendment after final dated Oct. 18, 2011, 30 pages.
U.S. Appl. No. 11/007,139: Advisory Action and rule 312 amendment, dated Nov. 4, 2011, 4 pages.
U.S. Appl. No. 11/007,139: Notice of Appeal filed Nov. 16, 2011, 1 page.
U.S. Appl. No. 11/007,139: Appeal Brief filed May 1, 2012, 93 pages.
U.S. Appl. No. 11/007,139: Notice of defective appeal brief, filed May 7, 2012, 3 pages.
U.S. Appl. No. 11/007,139: Appeal Brief filed May 15, 2012, 9 pages.
U.S. Appl. No. 11/007,139: Examiner's answer to appeal brief, filed Aug. 20, 2012, 35 pages.
U.S. Appl. No. 11/007,139: Reply Brief, filed Oct. 22, 2012, 29 pages.
U.S. Appl. No. 11/007,139: Appeal Docketing Notice, filed Nov. 6, 2012, 2 pages.
U.S. Appl. No. 11/007,139: Patent Board Decision, filed Jul. 24, 2015, 8 pages.
U.S. Appl. No. 11/007,139: RCE, filed Sep. 18, 2015, 19 pages.
U.S. Appl. No. 11/007,139: Non-Final Rejection, dated Dec. 31, 2015, 10 pages.
U.S. Appl. No. 11/007,139: Amendment/Req. Reconsideration—After Non-Final Rejection, dated Mar. 28, 2016, 19 pages.
U.S. Appl. No. 11/007,139: Final Rejection, dated Jun. 20, 2016, 12 pages.
U.S. Appl. No. 11/007,139: Response After Final Action, dated Jul. 29, 2016, 17 pages.
U.S. Appl. No. 11/007,139: Notice of Allowance and Fees, dated Aug. 23, 2016, 10 pages.
U.S. Appl. No. 11/007,139, filed Sep. 2, 2016, 3 pages.
U.S. Appl. No. 11/007,139: RCE, filed Nov. 10, 2016, 3 pages.
U.S. Appl. No. 11/007,139: Notice of Allowance and Fees, dated Dec. 29, 2016, 8 pages.
U.S. Appl. No. 11/007,139: Issue Notification, filed Apr. 19, 2017, 1 page.
U.S. Appl. No. 15/043,267, filed Feb. 12, 2016, 92 pages.
U.S. Appl. No. 15/043,267: Preliminary Amendment, dated Feb. 12, 2016, 7 pages.
U.S. Appl. No. 15/043,267, filed Mar. 7, 2016, 3 pages.
U.S. Appl. No. 15/043,267: Preliminary Amendment, dated Jun. 10, 2016, 9 pages.
U.S. Appl. No. 15/043,267, filed Oct. 25, 2016, 3 pages.
U.S. Appl. No. 15/043,267: Notice of Publication, filed Feb. 2, 2017, 1 page.
U.S. Appl. No. 11/006,320, filed Dec. 6, 2004, 75 pages.
U.S. Appl. No. 11/006,320: Response to Missing Parts and Preliminary Amendment filed May 9, 2005, 135 pages.
U.S. Appl. No. 11/006,320: Office Action—Restriction Requirement dated Mar. 26, 2007, 7 pages.
U.S. Appl. No. 11/006,320: Response to Restriction Requirement filed Apr. 27, 2007, 34 pages.
U.S. Appl. No. 11/006,320: Notice of Non-Compliant Amendment dated Jul. 6, 2007, 3 pages.
U.S. Appl. No. 11/006,320: Response to Non-Compliant Amendment filed Jul. 25, 2007, 33 pages.
U.S. Appl. No. 11/006,320, Non-final Office Action dated Oct. 1, 2007, 24 pages.
U.S. Appl. No. 11/006,320: Amendment filed Jan. 29, 2008, 45 pages.
U.S. Appl. No. 11/006,320: Notice of Non-Compliant Amendment dated Apr. 8, 2008, 4 pages.
U.S. Appl. No. 11/006,320: Amendment filed May 5, 2008, 44 pages.
U.S. Appl. No. 11/006,320: Non-final Office Action dated Aug. 15, 2008, 33 pages.
U.S. Appl. No. 11/006,320: Amendment filed Nov. 14, 2008, 40 pages.
U.S. Appl. No. 11/006,320: Office Action—Shortened Statutory Period dated Jan. 27, 2009, 2 pages.
U.S. Appl. No. 11/006,320: Amendment filed Apr. 27, 2009, 44 pages.
U.S. Appl. No. 11/006,320: Final Office Action dated Jul. 29, 2009, 13 pages.
U.S. Appl. No. 11/006,320: Amendment filed Nov. 30, 2009, 10 pages.
U.S. Appl. No. 11/006,320: Non-final Office Action dated Dec. 4, 2009, 25 pages.

(56) References Cited

OTHER PUBLICATIONS

U.S. Appl. No. 11/006,320: Response to Non-Final Office Action filed Feb. 23, 2010, 11 pages.
U.S. Appl. No. 11/006,320: Final Office Action dated May 24, 2010, 11 pages.
U.S. Appl. No. 11/006,320: Office Action response dated Aug. 24, 2010, 15 pages.
U.S. Appl. No. 11/006,320: Notice of Allowance dated Sep. 17, 2010, 8 pages.
U.S. Appl. No. 11/006,320: Examiner Interview Summary and supplemental Notice of Allowance dated Dec. 17, 2010, 9 pages.
U.S. Appl. No. 11/006,320: Rule 312 Amendment and Issue Fee payment filed Dec. 17, 2010, 10 pages.
U.S. Appl. No. 11/006,320: Issue Notification filed Jan. 12, 2011, 1 page.
U.S. Appl. No. 12/972,326, filed Dec. 17, 2010, 74 pages.
U.S. Appl. No. 12/972,326: Filing receipt and Notice to File Missing Parts filed Jan. 6, 2011, 5 pages.
U.S. Appl. No. 12/972,326: Response to Notice to File Missing parts filed Jan. 26, 2011, 14 pages.
U.S. Appl. No. 12/972,326, filed Feb. 18, 2011, 3 pages.
U.S. Appl. No. 12/972,326: Preliminary amendment dated May 20, 2011, 15 pages.
U.S. Appl. No. 12/972,326: Notice of publication and non-compliant amendment filed Jun. 2, 2011, 3 pages.
U.S. Appl. No. 12/972,326: Preliminary amendment dated Jul. 5, 2011, 21 pages.
U.S. Appl. No. 12/972,326: Notice of additional fee due, filed Jul. 12, 2011, 2 pages.
U.S. Appl. No. 12/972,326: Preliminary Amendment dated Aug. 10, 2011, 7 pages.
U.S. Appl. No. 12/972,326: Non-Final Office Action, dated Feb. 23, 2012, 9 pages.
U.S. Appl. No. 12/972,326: Abandonment, filed Sep. 18, 2012, 2 pages.
U.S. Appl. No. 13/014,677, filed Jan. 26, 2011, 90 pages.
U.S. Appl. No. 13/014,677: Notice to file missing parts and filing receipt, filed Mar. 23, 2011, 5 pages.
U.S. Appl. No. 13/014,677: Notice of Abandonment filed Nov. 29, 2011, 2 pages.
U.S. Appl. No. 11/006,848, filed Dec. 7, 2004, 59 pages.
U.S. Appl. No. 11/006,848: Notice to File Missing Parts filed Mar. 18, 2005, 2 pages.
U.S. Appl. No. 11/006,848: Response to Notice to File Missing Parts filed May 3, 2005, 101 pages.
U.S. Appl. No. 11/006,848: Non-Final Office Action dated Apr. 4, 2007, 11 pages.
U.S. Appl. No. 11/006,848: Response to Non-Final Office Action dated Oct. 3, 2007, 20 pages.
U.S. Appl. No. 11/006,848: Supplemental Amendment dated Nov. 13, 2007, 4 pages.
U.S. Appl. No. 11/006,848: Non-Final Office Action dated Feb. 5, 2008, 16 pages.
U.S. Appl. No. 11/006,848: Response to Non-Final Office Action filed Aug. 4, 2008, 27 pages.
U.S. Appl. No. 11/006,848: Final Office Action dated Dec. 2, 2008, 30 pages.
U.S. Appl. No. 11/006,848: RCE filed May 4, 2009, 24 pages.
U.S. Appl. No. 11/006,848: Notice of Allowance dated Jun. 11, 2009, 8 pages.
U.S. Appl. No. 11/006,848: Issue fee filed Sep. 11, 2009, 10 pages.
U.S. Appl. No. 11/006,848: Issue Notification filed Oct. 28, 2009, 1 page.
U.S. Appl. No. 12/573,829, filed Oct. 5, 2009, 64 pages.
U.S. Appl. No. 12/573,829: Notice to File Missing Parts and Filing Receipt filed Oct. 20, 2009, 5 pages.
U.S. Appl. No. 12/573,829: Preliminary Amendment dated Dec. 21, 2009, 17 pages.
U.S. Appl. No. 12/573,829, filed Jan. 4, 2010, 5 pages.
U.S. Appl. No. 12/573,829: Notice of Publication filed Apr. 15, 2010, 1 page.
U.S. Appl. No. 12/573,829: Office Action dated Jun. 28, 2010, 35 pages.
U.S. Appl. No. 12/573,829: Office Action Response dated Sep. 28, 2010, 22 pages.
U.S. Appl. No. 12/573,829: Office Action dated Nov. 1, 2010, 29 pages.
U.S. Appl. No. 12/573,829: Office Action Response dated Jan. 3, 2011, 29 pages.
U.S. Appl. No. 12/573,829: Advisory Action dated Jan. 7, 2011, 3 pages.
U.S. Appl. No. 12/573,829: Notice of Appeal filed Jan. 11, 2011, 1 page.
U.S. Appl. No. 12/573,829: Appeal Brief, filed May 4, 2011, 68 pages.
U.S. Appl. No. 12/573,829: Examiner's Answer to Appeal Brief, filed Jul. 21, 2011, 31 pages.
U.S. Appl. No. 12/573,829: Reply brief filed Sep. 21, 2011, 17 pages.
U.S. Appl. No. 12/573,829: Reply brief filed Oct. 5, 2011, 2 pages.
U.S. Appl. No. 12/573,829: Appeal Docketing notice filed Oct. 11, 2011, 2 pages.
U.S. Appl. No. 12/573,829: Appeal Board Decision, filed May 9, 2014, 10 pages.
U.S. Appl. No. 12/573,829: Request for continued examination, filed Jul. 9, 2014, 19 pages.
U.S. Appl. No. 12/573,829: Non-Final Rejectioin and Examiner's Search, dated Apr. 28, 2015, 22 pages.
U.S. Appl. No. 12/573,829: Amendment/Req. Reconsideration After Non-Final Rejection, filed Jul. 27, 2015, 21 pages.
U.S. Appl. No. 12/573,829: Final Rejection and Examiner search, dated Sep. 15, 2015, 17 pages.
U.S. Appl. No. 12/573,829: Response After Final Action, dated Nov. 16, 2015, 17 pages.
U.S. Appl. No. 12/573,829: Advisory Action, dated Dec. 2, 2015, 4 pages.
U.S. Appl. No. 12/573,829: Request for Continued Examination and Amendments, filed Dec. 14, 2015, 17 pages.
U.S. Appl. No. 12/573,829: Non-Final Rejection, dated Jun. 13, 2016, 18 pages.
U.S. Appl. No. 12/573,829: Amendment/Req. Reconsideration-After Non-Final Reject, dated Sep. 13, 2016, 24 pages.
U.S. Appl. No. 12/573,829, filed Sep. 15, 2016, 3 pages.
U.S. Appl. No. 12/573,829: Non-Final Rejection, dated Dec. 16, 2016, 10 pages.
U.S. Appl. No. 12/573,829: Amendment/Req. Reconsideration—After Non-Final Reject, dated Mar. 16, 2017, 18 pages.
U.S. Appl. No. 12/573,829: Final Rejection, dated May 2, 2017, 20 pages.
U.S. Appl. No. 12/573,829: After Final Consideration Program Request, filed Jul. 5, 2017, 13 pages.
U.S. Appl. No. 12/573,829: Advisory Action/After Final Consideration Program Decision, dated Aug. 29, 2017, 5 pages.
U.S. Appl. No. 12/573,829: RCE and Amendments, dated Sep. 5, 2017, 24 pages.
U.S. Appl. No. 12/573,829: Non-Final Rejection, dated Dec. 27, 2017, 13 pages.
U.S. Appl. No. 12/573,829: Amendment/Req. Reconsideration—After Non-Final Reject, dated Mar. 27, 2018, 22 pages.
U.S. Appl. No. 12/573,829: Final Rejection, dated Jul. 11, 2018, 15 pages.
U.S. Appl. No. 12/573,829: After Final Consideration Program Request, filed Sep. 7, 2018, 23 pages.
U.S. Appl. No. 11/006,841, file Dec. 7, 2004, 63 pages.
U.S. Appl. No. 11/006,841: Notice to file missing parts filed Jan. 10, 2005, 2 pages.
U.S. Appl. No. 11/006,841: Response to Notice to file missing parts and preliminary amendment dated Apr. 14, 2005, 105 pages.
U.S. Appl. No. 11/006,841: Non-Final OA dated Apr. 6, 2007, 16 pages.
U.S. Appl. No. 11/006,841: Response to Non-Final OA dated Sep. 6, 2007, 63 pages.

(56) References Cited

OTHER PUBLICATIONS

U.S. Appl. No. 11/006,841: Restriction Requirement dated Nov. 27, 2007, 5 pages.
U.S. Appl. No. 11/006,841: Restriction Requirement response dated Dec. 27, 2007, 36 pages.
U.S. Appl. No. 11/006,841: Restriction Requirement dated Mar. 17, 2008, 9 pages.
U.S. Appl. No. 11/006,841: Response to Restriction Requirement dated Jul. 17, 2008, 33 pages.
U.S. Appl. No. 11/006,841: Final Office Action dated Oct. 29, 2008, 54 pages.
U.S. Appl. No. 11/006,841: Response to Final Office Action dated Dec. 29. 2008, 45 pages.
U.S. Appl. No. 11/006,841: Advisory Action dated Jan. 6, 2009, 3 pages.
U.S. Appl. No. 11/006,841: RCE filed Apr. 23, 2009, 48 pages.
U.S. Appl. No. 11/006,841: Supplemental Response dated Jun. 26, 2009, 34 pages.
U.S. Appl. No. 11/006,841: Notice of Allowance dated Jun. 29, 2009, 40 pages.
U.S. Appl. No. 11/006,841: Issue Fee filed Sep. 29, 2009, 4 pages.
U.S. Appl. No. 11/006,841: Issue Notification filed Nov. 11, 2009, 1 page.
U.S. Appl. No. 11/006,841: Continuation application filed Oct. 13, 2009, 75 pages.
U.S. Appl. No. 11/006,841: Notice of Missing Parts filed Oct. 28, 2009, 6 pages.
U.S. Appl. No. 11/006,841: Response to Missing Parts filed Dec. 28, 2009, 25 pages.
U.S. Appl. No. 11/006,841, filed Jan. 7, 2010, 3 pages.
U.S. Appl. No. 11/006,841: Notice of Publication filed Apr. 15, 2010, 1 page.
U.S. Appl. No. 11/006,841: Restriction requirement dated Jun. 8, 2011, 6 pages.
U.S. Appl. No. 11/006,841: Response to restriction requirement dated Jul. 6, 2011, 19 pages.
U.S. Appl. No. 11/006,841: Non-Final Office Action, dated Aug. 23, 2011, 19 pages.
U.S. Appl. No. 11/006,841: Non-Final Office Action response dated Dec. 22, 2011, 38 pages.
U.S. Appl. No. 11/006,841: Final Rejection dated Jan. 20, 2012, 16 pages.
U.S. Appl. No. 11/006,841: Amendment, dated May 21, 2012, 23 pages.
U.S. Appl. No. 12/578,411: Advisory Action, dated May 31, 2012, 4 pages.
U.S. Appl. No. 12/578,411: RCE, filed Jun. 12, 2012, 38 pages.
U.S. Appl. No. 12/578,411: Notice of Allowance, dated Aug. 19, 2013, 19 pages.
U.S. Appl. No. 12/578,411: Issue fee payment and Rule 312 amendment, filed Nov. 14, 2013, 14 pages.
U.S. Appl. No. 12/578,411: Examiner response to rule 312 amendment, filed Nov. 19, 2013, 2 pages.
U.S. Appl. No. 12/578,411: Response to Amendment under rule 312, filed Dec. 3, 2013, 3 pages.
U.S. Appl. No. 12/578,411: Issue Notification, filed Dec. 18, 2013, 1 page.
U.S. Appl. No. 14/086,837, filed Nov. 21, 2013, 68 pages.
U.S. Appl. No. 14/086,837: Notice to File Missing Parts, filed Dec. 12, 2013, 5 Pages.
U.S. Appl. No. 14/086,837: Applicant Response to Pre-Exam Formalities Notice, filed Jun. 11, 2014, 26 Pages.
U.S. Appl. No. 14/086,837: Notice of Publication, filed Sep. 25, 2014, 4 Pages.
U.S. Appl. No. 14/086,837: Terminal Disclaimer, filed Nov. 14, 2014, 1 page.
U.S. Appl. No. 14/086,837: Examiner's search strategy and results, filed Dec. 2, 2014, 9 pages.
U.S. Appl. No. 14/086,837: Notice of Allowance and Fees, dated Dec. 2, 2014, 17 pages.
U.S. Appl. No. 14/086,837: Amendment After Notice of Allowance, filed Feb. 27, 2015, 9 pages.
U.S. Appl. No. 14/086,837: Issue Fee Payment, filed Feb. 27, 2015, 1 page.
U.S. Appl. No. 14/086,837: Issue Notification, filed May 6, 2015, 1 page.
U.S. Appl. No. 14/635,836, filed Mar. 2, 2015, 70 pages.
U.S. Appl. No. 14/635,836, filed Mar. 12, 2015, 3 pages.
U.S. Appl. No. 14/635,836: Notice to File Missing Parts, filed Mar. 12, 2015, 2 pages.
U.S. Appl. No. 14/635,836: Applicant Response to Pre-Exam Formalities Notice, filed May 12, 2015, 40 pages.
U.S. Appl. No. 14/635,836, filed May 19, 2015, 3 pages.
U.S. Appl. No. 14/635,836: Notice of Publicatioin, filed Aug. 27, 2015, 1 page.
U.S. Appl. No. 14/635,836: Electronic Terminal Disclaimer Approved and Filed, filed Nov. 13, 2015, 3 pages.
U.S. Appl. No. 14/635,836: Notice of Allowance and Fees Due, dated Apr. 18, 2016, 25 pages.
U.S. Appl. No. 14/635,836: Issue Fee Payment and Amendment after NOA, dated Jul. 15, 2016, 15 pages.
U.S. Appl. No. 14/635,836: Response to Amendment under Rule 312, filed Jul. 21, 2016, 1 page.
U.S. Appl. No. 14/635,836: Response to Amendment under Rule 312, filed Jul. 22, 2016, 2 pages.
U.S. Appl. No. 14/635,836: Issue Notification, filed Aug. 10, 2016, 1 page.
U.S. Appl. No. 15/250,118, filed Aug. 29, 2016, 71 pages.
U.S. Appl. No. 15/250,118: Preliminary Amendment, dated Aug. 29, 2016, 20 pages.
U.S. Appl. No. 15/250,118, filed Sep. 9, 2016, 3 pages.
U.S. Appl. No. 15/250,118: Applicant Response to Pre-Exam Formalities Notice, dated Nov. 8, 2016, 21 pages.
U.S. Appl. No. 15/250,118, filed Nov. 15, 2016, 3 pages.
U.S. Appl. No. 15/250,118: Notice of Publication, filed Feb. 23, 2017, 1 page.
U.S. Appl. No. 15/250,118: Non-Final Rejection, dated Jun. 15, 2017, 22 pages.
U.S. Appl. No. 15/250,118: Amendment/Req. Reconsideration—After Non-Final Reject, dated Sep. 14, 2017, 44 pages.
U.S. Appl. No. 15/250,118: Final Rejection, dated Dec. 15, 2017, 25 pages.
U.S. Appl. No. 15/250,118: RCE and Amendments, dated Apr. 16, 2018, 44 pages.
U.S. Appl. No. 11/006,440, filed Dec. 6, 2004, 85 pages.
U.S. Appl. No. 11/006,440: Notice to file missing parts filed Jan. 11, 2005, 2 pages.
U.S. Appl. No. 11/006,440: Response to Notice to file missing parts filed Mar. 15, 2005, 8 pages.
U.S. Appl. No. 11/006,440: Preliminary Amendment dated Apr. 28, 2005, 140 pages.
U.S. Appl. No. 11/006,440: Preliminary Amendment and Substitute Specification dated Oct. 10, 2006, 139 pages.
U.S. Appl. No. 11/006,440: Restriction Requirement dated Mar. 29, 2007, 5 pages.
U.S. Appl. No. 11/006,440: Response to Restriction Requirement dated Apr. 30, 2007, 42 pages.
U.S. Appl. No. 11/006,440: Non-Final Office Action dated Jun. 21, 2007, 15 pages.
U.S. Appl. No. 11/006,440: Response to Non-Final Office Action dated Nov. 20, 2007, 42 pages.
U.S. Appl. No. 11/006,440: Final Office Action dated Feb. 6, 2008, 13 pages.
U.S. Appl. No. 11/006,440: Response to Final Office Action dated Apr. 7, 2008, 34 pages.
U.S. Appl. No. 11/006,440: Advisory Action dated May 9, 2008, 3 pages.
U.S. Appl. No. 11/006,440: Notice of appeal filed Aug. 4, 2008, 1 page.
U.S. Appl. No. 11/006,440: RCE filed Nov. 4, 2008, 39 pages.
U.S. Appl. No. 11/006,440: Final Office Action dated Jan. 23, 2009, 22 pages.

(56) References Cited

OTHER PUBLICATIONS

U.S. Appl. No. 11/006,440: Amendment after Final dated Apr. 23, 2009, 34 pages.
U.S. Appl. No. 11/006,440: Supplemental Amendment dated Jul. 17, 2009, 29 pages.
U.S. Appl. No. 11/006,440: Notice of Allowance dated Jul. 31, 2009, 15 pages.
U.S. Appl. No. 11/006,440: Examiner's Amendment and Reasons for Allowance dated Sep. 3, 2009, 9 pages.
U.S. Appl. No. 11/006,440: Issue Fee filed Nov. 2, 2009, 12 pages.
U.S. Appl. No. 11/006,440: Issue Notification filed Dec. 2, 2009, 1 page.
U.S. Appl. No. 12/627,816: Continuation application filed Nov. 30, 2009, 95 pages.
U.S. Appl. No. 12/627,816: Notice of Missing Parts filed Dec. 15, 2009, 2 pages.
U.S. Appl. No. 12/627,816: Response to Missing Parts filed Apr. 12, 2010, 21 pages.
U.S. Appl. No. 12/627,816, filed Apr. 20, 2010, 3 pages.
U.S. Appl. No. 12/627,816: Notice of Publication filed Jul. 29, 2010, 1 page.
U.S. Appl. No. 12/627,816: Non-Final OA, dated May 5, 2011, 19 pages.
U.S. Appl. No. 12/627,816: Non-Final OA response, dated Nov. 7, 2011, 12 pages.
U.S. Appl. No. 12/627,816: Final Rejection dated Nov. 17, 2011, 18 pages.
U.S. Appl. No. 12/627,816: RCE filed Feb. 17, 2012, 20 pages.
U.S. Appl. No. 12/627,816: Terminal disclaimer review, filed Mar. 7, 2012, 1 page.
U.S. Appl. No. 12/627,816: Notice of Allowance, dated Aug. 1, 2013, 16 pages.
U.S. Appl. No. 12/627,816: Issue fee payment and Rule 312 amendment, dated Nov. 1, 2013, 14 pages.
U.S. Appl. No. 12/627,816: Examiner response to rule 312 amendment, dated Nov. 13, 2013, 2 pages.
U.S. Appl. No. 12/627,816: Issue Notification, filed Nov. 26, 2013, 1 page.
U.S. Appl. No. 14/086,808, filed Nov. 21, 2013, 87 Pages.
U.S. Appl. No. 14/086,808: Notice to File Missing Parts and Filing Receipt, filed Dec. 11, 2013, 5 Pages.
U.S. Appl. No. 14/086,808: Applicant Response to Pre-Exam Formalitites Notice, filed Jun. 11, 2014, 53 Pages.
U.S. Appl. No. 14/086,808, filed Jun. 17, 2014, 3 Pages.
U.S. Appl. No. 14/086,808: Notice of Publicatioin, filed Sep. 25, 2014, 1 Page.
U.S. Appl. No. 14/086,808: Terminal Disclaimer, filed Oct. 24, 2014, 2 pages.
U.S. Appl. No. 14/086,808: Terminal Disclaimer Review Decision, filed Oct. 29, 2014, 1 page.
U.S. Appl. No. 14/086,808: Terminal Disclaimer, filed Nov. 4, 2014, 2 pages.
U.S. Appl. No. 14/086,808: Terminal Disclaimer Review Decision, filed Nov. 13, 2014, 1 page.
U.S. Appl. No. 14/086,808: Examiner's search strategy and results, filed Nov. 17, 2014, 5 pages.
U.S. Appl. No. 14/086,808: Notice of Allowance and fees, dated Nov. 17, 2014, 16 pages.
U.S. Appl. No. 14/086,808: Issue Fee Payment and Rule 312 amendment, filed Feb. 17, 2015, 1 page.
U.S. Appl. No. 14/086,808: Amendment After Notice of Allowance, dated Feb. 17, 2015, 17 pages.
U.S. Appl. No. 14/086,808: Response to Amendment under Rule 312, dated Feb. 20, 2015, 2 pages.
U.S. Appl. No. 14/086,808: Response to Amendment under Rule 312, dated Feb. 25, 2015, 3 pages.
U.S. Appl. No. 14/086,808: Issue Notification, filed Mar. 18, 2015, 1 page.
U.S. Appl. No. 14/625,473, filed Feb. 18, 2015, 92 pages.
U.S. Appl. No. 14/625,473, filed Mar. 18, 2015, 3 pages.
U.S. Appl. No. 14/625,473: Notice to File Missing Parts, filed Mar. 18, 2015.
U.S. Appl. No. 14/625,473: Response to Pre-Exam Formalities Notice and Preliminary Amendment, filed May 18, 2015, 28 pages.
U.S. Appl. No. 14/625,473, filed May 20, 2015, 3 pages.
U.S. Appl. No. 14/625,473: Notice of Publication, filed Aug. 27, 2015, 1 page.
U.S. Appl. No. 14/625,473: Electronic Terminal Disclaimer Filed and Approved, filed Nov. 13, 2015, 3 pages.
U.S. Appl. No. 14/625,473: Notice of Allowance, dated Mar. 28, 2016, 19 pages.
U.S. Appl. No. 14/625,473: Issue Fee Payment and Amendments after Notice of Allowance, dated Jun. 28, 2016, 24 pages.
U.S. Appl. No. 14/625,473: Response to Amendment under Rule 312, filed Jun. 30, 2016, 1 page.
U.S. Appl. No. 14/625,473: Issue Notification, filed Jul. 20, 2016, 1 page.
U.S. Appl. No. 15/214,168: Application as filed with preliminary amendments, dated Jul. 19, 2016, 116 pages.
U.S. Appl. No. 15/214,168, filed Aug. 3, 2016, 4 pages.
U.S. Appl. No. 15/214,168: Corrected Filing Receipt, filed Oct. 12, 2016, 4 pages.
U.S. Appl. No. 15/214,168: Notice of Publication, filed Nov. 10, 2016, 1 page.
U.S. Appl. No. 15/214,168: Non-Final Rejection, dated Mar. 2, 2017, 20 pages.
U.S. Appl. No. 15/214,168: Amendment/Req. Reconsideration—After Non-Final Reject, dated Jun. 2, 2017, 39 pages.
U.S. Appl. No. 15/214,168: Terminal Disclaimer, filed Jul. 17, 2017, 4 pages.
U.S. Appl. No. 15/214,168: Notice of Allowance and Fees Due, dated Aug. 1, 2017, 26 pages.
U.S. Appl. No. 15/214,168: Amendment after Notice of Allowance, dated Nov. 1, 2017, 22 pages.
U.S. Appl. No. 15/214,168: Issue Notification, filed Nov. 21, 2017, 1 page.
U.S. Appl. No. 15/802,348: Application as filed with Preliminary Amendment, dated Nov. 2, 2017, 126 pages.
U.S. Appl. No. 15/802,348, filed Nov. 30, 2017, 4 pages.
U.S. Appl. No. 15/802,348: Notice to File Corrected Application Papers, filed Nov. 30, 2017, 2 pages.
U.S. Appl. No. 15/802,348: Applicant Response to Pre-Exam Formalities Notice, filed Jan. 9, 2018, 17 pages.
U.S. Appl. No. 15/802,348, filed Jan. 11, 2018, 4 pages.
U.S. Appl. No. 15/802,348: Notice of Publication, filed Apr. 19, 2018, 1 page.
U.S. Appl. No. 11/006,446, filed Dec. 6, 2004, 91 pages.
U.S. Appl. No. 11/006,446: Notice of Missing Parts filed Jan. 24, 2005, 3 pages.
U.S. Appl. No. 11/006,446: Response to Notice to File Missing Parts filed Mar. 29, 2005, 8 pages.
U.S. Appl. No. 11/006,446: Preliminary Amendment filed Apr. 28, 2005, 118 pages.
U.S. Appl. No. 11/006,446: Office Action—Restriction Requirment dated Apr. 4, 2007, 5 pages.
U.S. Appl. No. 11/006,446: Response to Office Action—Restriction Requirement filed May 3, 2007, 6 pages.
U.S. Appl. No. 11/006,446: Non-final Office Action dated Jul. 26, 2007, 45 pages.
U.S. Appl. No. 11/006,446: Amendment filed Nov. 26, 2007, 38 pages.
U.S. Appl. No. 11/006,446: Non-final Office Action dated Feb. 20, 2008, 67 pages.
U.S. Appl. No. 11/006,446: Amendment filed Jul. 21, 2008, 33 pages.
U.S. Appl. No. 11/006,446: Final Office Action dated Oct. 28, 2008, 49 pages.
U.S. Appl. No. 11/006,446: Amendment filed Dec. 29, 2008, 33 pages.
U.S. Appl. No. 11/006,446: Advisory Action dated Jan. 7, 2009, 4 pages.
U.S. Appl. No. 11/006,446: RCE with Amendment filed Apr. 28, 2009, 38 pages.

(56) References Cited

OTHER PUBLICATIONS

U.S. Appl. No. 11/006,446: Non-final Office Action dated Jul. 7, 2009, 41 pages.
U.S. Appl. No. 11/006,446: Examiner Interview Summary and Search Results dated Oct. 26, 2009, 6 pages.
U.S. Appl. No. 11/006,446: Amendment dated Dec. 7, 2009, 33 pages.
U.S. Appl. No. 11/006,446: Examiner Interview Summary dated Mar. 19, 2010, 4 pages.
U.S. Appl. No. 11/006,446: Notice of Allowance/Allowability dated Mar. 19, 2010, 29 pages.
U.S. Appl. No. 11/006,446: Issue Fee Payment and 312 Amendment filed Jun. 21, 2010, 23 pages.
U.S. Appl. No. 11/006,446: Rule 312 Amendment filed Aug. 19, 2010, 2 pages.
U.S. Appl. No. 11/006,446: Formal drawings filed Aug. 25, 2010, 29 pages.
U.S. Appl. No. 11/006,446: Issue Notification filed Sep. 1, 2010, 1 page.
U.S. Appl. No. 12/830,236: Divisional Application filed Jul. 2, 2010, 103 pages.
U.S. Appl. No. 12/830,236: Notice to File Corrected Application Papers filed Jul. 16, 2010, 5 pages.
U.S. Appl. No. 12/830,236: Response to Notice to File Corrected Application Papers filed Aug. 25, 2010, 32 pages.
U.S. Appl. No. 12/830,236, filed Sep. 3, 2010, 3 pages.
U.S. Appl. No. 12/830,236: Notice of Publication filed Dec. 16, 2010, 1 page.
U.S. Appl. No. 12/830,236: Restriction requirement dated Mar. 18, 2011, 6 pages.
U.S. Appl. No. 12/830,236: Restriction requirement response dated Apr. 18, 2011, 5 pages.
U.S. Appl. No. 12/830,236: Non-Final Office Action, dated May 11, 2011, 10 pages.
U.S. Appl. No. 12/830,236: Response to Non-Final Office Action dated Jul. 6, 2011, 18 pages.
U.S. Appl. No. 12/830,236: Final Office Action, dated Oct. 14, 2011, 18 pages.
U.S. Appl. No. 12/830,236: Amendment after final, filed Jan. 17, 2012, 26 pages.
U.S. Appl. No. 12/830,236: Advisory Action, dated Feb. 8, 2012, 6 pages.
U.S. Appl. No. 12/830,236: Notice of Appeal filed Mar. 8, 2012, 3 pages.
U.S. Appl. No. 12/830,236: RCE, filed Jun. 5, 2012, 23 pages.
U.S. Appl. No. 12/830,236: Non-Final Office Action, dated Jul. 31, 2012, 18 pages.
U.S. Appl. No. 12/830,236: Amendment, filed Nov. 1, 2012, 27 pages.
U.S. Appl. No. 12/830,236: Final Office Action, dated Feb. 27, 2013, 35 pages.
U.S. Appl. No. 12/830,236: Response after final, filed Jun. 27, 2013, 36 pages.
U.S. Appl. No. 12/830,236: Advisory action, dated Jul. 12, 2013, 4 pages.
U.S. Appl. No. 12/830,236: Notice of appeal, filed Jul. 19, 2013, 2 pages.
U.S. Appl. No. 12/830,236: Appeal brief, filed Sep. 18, 2013, 44 pages.
U.S. Appl. No. 12/830,236: Examiners answer to appeal brief, filed Dec. 18, 2013, 35 pages.
U.S. Appl. No. 12/830,236: Reply Brief as filed Feb. 18, 2014, 16 Pages.
U.S. Appl. No. 12/830,236: Appeal Docketing Notice, filed Mar. 21, 2014, 2 Pages.
U.S. Appl. No. 12/830,236: Patent Board Decision, filed Mar. 9, 2016, 6 pages.
U.S. Appl. No. 12/830,236: RCE and Amendments, dated Apr. 27, 2016, 15 pages.
U.S. Appl. No. 12/830,236: Non-Final Rejection and Examiner Search, dated Jun. 29, 2016, 75 pages.
U.S. Appl. No. 12/830,236: Amendment/Req. Reconsideration—After Non-Final Reject, dated Sep. 6, 2016, 12 pages.
U.S. Appl. No. 12/830,236: Final Rejection, dated Dec. 14, 2016, 22 pages..
U.S. Appl. No. 12/830,236: Response After Final Action, dated Feb. 13, 2017, 14 pages.
U.S. Appl. No. 12/830,236: Advisory Action, dated Mar. 3, 2017, 2 pages.
U.S. Appl. No. 12/830,236: RCE and Amendments, dated Apr. 14, 2017, 17 pages.
U.S. Appl. No. 12/830,236: Non-Final Rejection, dated Jun. 21, 2017, 30 pages.
U.S. Appl. No. 12/830,236: Amendment/Req. Reconsideration—After Non-Final Reject, dated Oct. 23, 2017, 18 pages.
U.S. Appl. No. 12/830,236: Non-Final Rejection, dated Feb. 6, 2018, 28 pages.
U.S. Appl. No. 12/830,236: Amendment/Req. Reconsideration—After Non-Final Reject, dated May 4, 2018, 26 pages.
U.S. Appl. No. 12/830,236: Final Rejection, dated Sep. 5, 2018, 30 pages.
U.S. Appl. No. 11/385,257, filed Mar. 20, 2006, 118 pages.
U.S. Appl. No. 11/385,257: Notice of Missing Parts filed May 3, 2006, 2 pages.
U.S. Appl. No. 11/385,257: Response to Missing Parts filed Aug. 3, 2006, 46 pages.
U.S. Appl. No. 11/385,257: Notice of Publication filed Nov. 30, 2006, 1 page.
U.S. Appl. No. 11/385,257: Non-final Office Action dated Apr. 29, 2008, 44 pages.
U.S. Appl. No. 11/385,257: Amendment filed Jul. 29, 2008, 29 pages.
U.S. Appl. No. 11/385,257: Final Office Action dated Dec. 9, 2008, 47 pages.
U.S. Appl. No. 11/385,257: RCE with Amendment filed May 11, 2009, 38 pages.
U.S. Appl. No. 11/385,257: Supplemental Amendment filed May 26, 2009, 32 pages.
U.S. Appl. No. 11/385,257: Notice of Non-Compliant Amendment filed Jun. 1, 2009, 3 pages.
U.S. Appl. No. 11/385,257: Amendment filed Jun. 30, 2009, 34 pages.
U.S. Appl. No. 11/385,257: Non-final Office Action dated Sep. 14, 2009, 60 pages.
U.S. Appl. No. 11/385,257: Response to Non-Final Office Action filed Jan. 13, 2010, 34 pages.
U.S. Appl. No. 11/385,257: Final Office Action dated Apr. 12, 2010, 47 pages.
U.S. Appl. No. 11/385,257: RCE filed Aug. 12, 2010, 35 pages.
U.S. Appl. No. 11/385,357: Office Action dated Sep. 30, 2010, 39 pages.
U.S. Appl. No. 11/385,357: Office Action response, dated Mar. 29, 2011, 31 pages.
U.S. Appl. No. 11/385,357: Final Rejection dated Jun. 1, 2011, 40 pages.
U.S. Appl. No. 11/385,357: Request for continued Examination dated Nov. 1, 2011, 30 pages.
U.S. Appl. No. 11/385,357: Non-Final Office Action, dated Jan. 19, 2012, 40 pages.
U.S. Appl. No. 11/385,257: Amendment, dated Apr. 6, 2012, 30 pages.
U.S. Appl. No. 11/385,257: Notice of allowance and Examiner interview summary, dated Jun. 22, 2012, 36 pages.
U.S. Appl. No. 11/385,257: Office communication concerning previous IDS filing, dated Oct. 4, 2012, 4 pages.
U.S. Appl. No. 11/385,257: Miscellaneous Communication to Applicant, filed Oct. 15, 2012, 3 pages.
U.S. Appl. No. 11/385,257: Rule 312 Amendment, filed Dec. 12, 2012, 10 pages.
U.S. Appl. No. 11/385,257: Issue Notification, filed Dec. 22, 2012, 1 page.
U.S. Appl. No. 13/625,812, filed Sep. 24, 2012, 123 pages.

(56) References Cited

OTHER PUBLICATIONS

U.S. Appl. No. 13/625,812: Notice to file missing parts, filed Oct. 15, 2012, 6 pages.
U.S. Appl. No. 13/625,812: Response to Notice to file missing parts and preliminary amendment, dated Mar. 8, 2013, 47 pages.
U.S. Appl. No. 13/625,812: Notice of incomplete reply, filed Mar. 15, 2013, 3 pages.
U.S. Appl. No. 13/625,812: Response to incomplete reply notice, filed Apr. 2, 2013, 5 pages.
U.S. Appl. No. 13/625,812: Non-Final office action, dated Jul. 26, 2013, 29 pages.
U.S. Appl. No. 13/625,812: Publication notice, filed Aug. 1, 2013, 1 page.
U.S. Appl. No. 13/625,812: Response to non-final office action, dated Oct. 9, 2013, 15 pages.
U.S. Appl. No. 13/625,812: Final rejection, dated Dec. 3, 2013, 28 pages.
U.S. Appl. No. 13/625,812: Response After Final Action, dated Apr. 1, 2014, 1 Page.
U.S. Appl. No. 13/625,812: Advisory Action, dated Apr. 9, 2014, 3 Pages.
U.S. Appl. No. 13/625,812: Notice of Appeal, filed May 5, 2014, 1 Page.
U.S. Appl. No. 13/625,812: Request for Continued Examination, filed Aug. 4, 2014, 18 Pages.
U.S. Appl. No. 13/625,812: Request for Corrected Filing Receipt, filed Aug. 21, 2014, 6 Pages.
U.S. Appl. No. 13/625,812, filed Aug. 27, 2014, 3 Pages.
U.S. Appl. No. 13/625,812: Notice of Allowance and Fees, dated Dec. 9, 2014, 20 pages.
U.S. Appl. No. 13/625,812, filed Feb. 2, 2015, 3 pages.
U.S. Appl. No. 13/625,812, filed Feb. 6, 2015, 3 pages.
U.S. Appl. No. 13/625,812: Terminal Disclaimer filed Mar. 2, 2015, 1 page.
U.S. Appl. No. 13/625,812: Post Allowance Arguments/Amendments, filed Mar. 6, 2015, 6 pages.
U.S. Appl. No. 13/625,812: Amendment After Notice of Allowance, filed Mar. 9, 2015, 3 pages.
U.S. Appl. No. 13/625,812: Issue Fee Payment, filed Mar. 9, 2015, 1 page.
U.S. Appl. No. 13/625,812: Terminal Disclaimer Review Decision, filed Mar. 12, 2015.
U.S. Appl. No. 14/641,735, filed Mar. 9, 2015, 126 pages.
U.S. Appl. No. 14/641,735, filed Mar. 20, 2015, 3 pages.
U.S. Appl. No. 14/641,735: Notice to File Missing Parts, filed Mar. 20, 2015, 2 pages.
U.S. Appl. No. 14/641,735: Notice of Incomplete Reply, filed Jun. 26, 2015, 2 pages.
U.S. Appl. No. 14/641,735: Applicant Response to Pre-Exam Formalities Notice and Amendments, filed Jul. 8, 2015, 32 pages.
U.S. Appl. No. 14/641,735: Electronic Terminal Disclaimer, filed Aug. 27, 2015, 3 pages.
U.S. Appl. No. 14/641,735: Notice of Publication, filed Oct. 29, 2015, 1 page.
U.S. Appl. No. 14/641,735: Preliminary Amendment, dated Jan. 14, 2016, 8 pages.
U.S. Appl. No. 14/641,735: Non-Final Rejection, dated Jul. 14, 2017, 14 pages.
U.S. Appl. No. 14/641,735: Letter Restarting Period for Response, filed Aug. 24, 2017, 22 pages.
U.S. Appl. No. 14/641,735: Amendment/Req. Reconsideration—After Non-Final Reject, dated Nov. 24, 2017, 28 pages.
U.S. Appl. No. 14/641,735: Final Rejection, dated Mar. 15, 2018, 25 pages.
U.S. Appl. No. 14/641,735: Response After Final Action, dated May 15, 2018, 28 pages.
U.S. Appl. No. 14/641,735: Advisory Action, dated Jun. 8, 2018, 4 pages.
U.S. Appl. No. 14/641,735: Internet Communications Authorized, filed Jun. 23, 2018, 20 pages.
U.S. Appl. No. 14/641,735: RCE and Amendments, dated Jul. 16, 2018, 34 pages.
U.S. Appl. No. 11/319,758, filed Dec. 27, 2005, 79 pages.
U.S. Appl. No. 11/319,758: Notice of Missing Parts filed Feb. 1, 2006, 2 pages.
U.S. Appl. No. 11/319,758: Non-final Office Action dated Nov. 12, 2008, 46 pages.
U.S. Appl. No. 11/319,758: Amendment filed May 12, 2009, 40 pages.
U.S. Appl. No. 11/319,758: Final Office Action dated Aug. 3, 2009, 39 pages.
U.S. Appl. No. 11/319,758: RCE filed Jan. 4, 2010, 45 pages.
U.S. Appl. No. 11/319,758: Non-Final Office Action dated Mar. 30, 2010, 39 pages.
U.S. Appl. No. 11/319,758: Office Action response dated Jul. 29, 2010, 30 pages.
U.S. Appl. No. 11/319,758: Final Office Action dated Oct. 28, 2010, 31 pages.
U.S. Appl. No. 11/319,758: Request for Continued Examination, filed Mar. 28, 2011, 32 pages.
U.S. Appl. No. 11/319,758: Non-Final office action dated Jun. 3, 2011, 31 pages.
U.S. Appl. No. 11/319,758: Non-Final Office Action Response dated Nov. 3, 2011, 29 pages.
U.S. Appl. No. 11/319,758: Final Office Action, dated Jan. 17, 2012, 22 pages.
U.S. Appl. No. 11/319,758: Amendment after final, dated May 17, 2012, 34 pages.
U.S. Appl. No. 11/319,758: Advisory Action, dated Jun. 20, 2012, 3 pages.
U.S. Appl. No. 11/319,758: Amendment after final, filed Jun. 28, 2012, 29 pages.
U.S. Appl. No. 11/319,758: Notice of Allowance and examiner's interview summary, dated Jul. 17, 2012, 10 pages.
U.S. Appl. No. 13/632,581: Issue Fee payment, Rule 312 and Misellaneous Communication filed Oct. 12, 2012, 12 pages.
U.S. Appl. No. 13/632,581: Issue Notification, filed Oct. 31, 2012, 1 page.
U.S. Appl. No. 13/632,581, filed Oct. 1, 2012, 88 Pages.
U.S. Appl. No. 13/632,581: Notice to File Missing Parts and Filing Receipt, filed Oct. 22, 2012, 27 Pages.
U.S. Appl. No. 13/632,581, filed Mar. 5, 2004, 3 Pages.
U.S. Appl. No. 13/632,581: Notice of Publication, filed Jun. 13, 2013, 1 Page.
U.S. Appl. No. 13/632,581: Non-final Office Action, dated Jul. 3, 2013, 22 Pages.
U.S. Appl. No. 13/632,581: Non-Final Office Action Response, dated Sep. 11, 2013, 23 Pages.
U.S. Appl. No. 13/632,581: Final Office Action, dated Dec. 18, 2013, 27 Pages.
U.S. Appl. No. 13/632,581: Response After Final Action, dated Mar. 18, 2014, 37 Pages.
U.S. Appl. No. 13/632,581: Advisory Action, dated Apr. 3, 2014, 4 Pages.
U.S. Appl. No. 13/632,581: Notice of Appeal filed Jul. 17, 2014, 2 Pages.
U.S. Appl. No. 13/632,581: Request for Continued Examination, filed Jul. 16, 2014, 23 Pages.
U.S. Appl. No. 13/632,581: Notice Non-Compliant Amendment, filed Oct. 20, 2014, 5 pages.
U.S. Appl. No. 13/632,581: Amendment/Req Reconsideration after Non-Final Reject, filed Nov. 4, 2014, 16 pages.
U.S. Appl. No. 13/632,581: Non-Final Rejection, dated Jan. 27, 2015, 16 pages.
U.S. Appl. No. 13/632,581: Amendment/Req Reconsideration Non-Final Rejection and Amendments, filed Apr. 20, 2015, 24 pages.
U.S. Appl. No. 13/632,581: Final Rejection, dated Jul. 20, 2015, 21 pages.
U.S. Appl. No. 13/632,581: After Final Consideration Request and Response, filed Sep. 21, 2015, 28 pages.
U.S. Appl. No. 13/632,581: Advisory Action and After Final Decision, dated Oct. 2, 2015, 18 pages.

(56) References Cited

OTHER PUBLICATIONS

U.S. Appl. No. 13/632,581: RCE and Amendments, dated Nov. 30, 2015, 55 pages.
U.S. Appl. No. 13/632,581: Notice of Allowance and Fees, dated Dec. 17, 2015, 5 pages.
U.S. Appl. No. 13/632,581, filed Jan. 22, 2016, 4 pages.
U.S. Appl. No. 13/632,581: Electronic Terminal Disclaimer, filed Mar. 7, 2016, 3 pages.
U.S. Appl. No. 13/632,581: Issue Fee Payment, filed Mar. 16, 2016, 1 page.
U.S. Appl. No. 13/632,581: Amendment after Notice of Allowance, dated Mar. 16, 2016, 19 pages.
U.S. Appl. No. 13/632,581: Response to Amendment under Rule 312, dated Mar. 22, 2016, 2 pages.
U.S. Appl. No. 13/632,581: Issue Notification, filed Apr. 13, 2016, 1 page.
U.S. Appl. No. 15/081,612, filed Mar. 25, 2016, 87 Pages.
U.S. Appl. No. 15/081,612: Notice to File Missing Parts and Filing Receipt, filed Apr. 11, 2016, 4 Pages.
U.S. Appl. No. 15/081,612, filed Apr. 11, 2016, 3 Pages.
U.S. Appl. No. 15/081,612: Applicant Response to Pre-Exam Formalities Notice and Preliminary Amendments, dated Jun. 13, 2016, 34 pages.
U.S. Appl. No. 15/081,612: Preliminary Amendment, dated Jun. 14, 2016, 4 pages.
U.S. Appl. No. 15/081,612, filed Jun. 21, 2016, 3 pages.
U.S. Appl. No. 15/081,612: Non-Final Rejection, dated Jul. 27, 2016, 9 pages.
U.S. Appl. No. 15/081,612: Electronic Terminal Disclaimer, filed Sep. 23, 2016, 3 pages.
U.S. Appl. No. 15/081,612: Notice of Publication, filed Sep. 29, 2016, 1 page.
U.S. Appl. No. 15/081,612: Amendment/Req. Reconsideration—After Non-Final Reject, dated Oct. 17, 2016, 10 pages.
U.S. Appl. No. 15/081,612: Notice of Allowance and Fees, dated Oct. 27, 2016, 5 pages.
U.S. Appl. No. 15/081,612: RCE, filed Jan. 30, 2017, 2 pages.
U.S. Appl. No. 15/081,612: Issue Fee Payment, filed Jan. 30, 2017, 1 page.
U.S. Appl. No. 15/081,612: Notice of Allowance and Fees Due, Jan. 30, 2017, 2 pages.
U.S. Appl. No. 15/081,612: Notice of Allowance and Fees Due, dated Feb. 13, 2017, 7 pages.
U.S. Appl. No. 15/081,612: Amendment After Notice of Allowance, dated Mar. 20, 2017, 4 pages.
U.S. Appl. No. 15/081,612: Issue Fee Payment, filed Mar. 20, 2017, 1 page.
U.S. Appl. No. 15/081,612: Issue Notification, filed Apr. 20, 2017, 1 page.
U.S. Appl. No. 15/464,205, filed Mar. 20, 2017, 84 pages.
U.S. Appl. No. 15/464,205: Notice to File Missing Parts, filed Mar. 28, 2017, 5 pages.
U.S. Appl. No. 15/464,205: Applicant Response to Pre-Exam Formalities Notice, filed May 31, 2017, 86 pages.
U.S. Appl. No. 15/464,205, filed Mar. 28, 2017, 4 pages.
U.S. Appl. No. 15/464,205: Preliminary Amendment, dated May 31, 2017, 8 pages.
U.S. Appl. No. 15/464,205, filed Jun. 2, 2017, 4 pages.
U.S. Appl. No. 11/006,842, filed Dec. 7, 2004, 58 pages.
U.S. Appl. No. 11/006,842: Notice to file missing parts filed Jan. 10, 2005, 2 pages.
U.S. Appl. No. 11/006,842: Response to Notice to file missing parts filed Apr. 1, 2005, 7 pages.
U.S. Appl. No. 11/006,842: Preliminary Amendment dated May 2, 2005, 93 pages.
U.S. Appl. No. 11/006,842: Restriction Requirement dated Jan. 23, 2008, 5 pages.
U.S. Appl. No. 11/006,842: Response to Restriction Requirement dated Feb. 25, 2008, 25 pages.
U.S. Appl. No. 11/006,842: Restriction Requirement dated May 13, 2008, 5 pages.
U.S. Appl. No. 11/006,842: Response to Restriction Requirement dated Aug. 13, 2008, 24 pages.
U.S. Appl. No. 11/006,842: Non-Final Office Action dated Nov. 3, 2008.
U.S. Appl. No. 11/006,842: Response to Non-Final Office Action dated May 4, 2009, 35 pages.
U.S. Appl. No. 11/006,842: Supplemental Response dated Jul. 17, 2009, 23 pages.
U.S. Appl. No. 11/006,842: Notice of Allowance dated Jul. 27, 2009, 13 pages.
U.S. Appl. No. 11/006,842: Issue Fee filed Oct. 27, 2009, 1 page.
U.S. Appl. No. 11/006,842: Issue notification filed Nov. 18, 2009, 1 page.
U.S. Appl. No. 12/613,450: Continuation application filed Nov. 5, 2009, 63 pages.
U.S. Appl. No. 12/613,450: Notice of Missing Parts filed Nov. 18, 2009, 2 pages.
U.S. Appl. No. 12/613,450: Preliminary Amendment and Response to Missing Parts filed Jan. 19, 2010, 16 pages.
U.S. Appl. No. 12/613,450, filed Jan. 27, 2010, 3 pages.
U.S. Appl. No. 12/613,450: Notice of Publication filed May 6, 2010, 1 page.
U.S. Appl. No. 12/613,450: Restriction requirement dated Jun. 10, 2011, 5 pages.
U.S. Appl. No. 12/613,450: Response to restriction requirement dated Jul. 6, 2011, 17 pages.
U.S. Appl. No. 12/613,450: Non-Final Office Action, dated Aug. 25, 2011, 15 pages.
U.S. Appl. No. 12/613,450: Non-Final OA response dated Dec. 27, 2011, 28 pages.
U.S. Appl. No. 12/613,450: Final rejection, dated Feb. 14, 2012, 14 pages.
U.S. Appl. No. 12/613,450: Amendment after final, filed Jun. 8, 2012, 23 pages.
U.S. Appl. No. 12/613,450: Advisory Action, dated Jun. 20, 2012, 4 pages.
U.S. Appl. No. 12/613,450: RCE, filed Jul. 12, 2012, 25 pages.
U.S. Appl. No. 12/613,450: Notice of Allowance, dated Oct. 7, 2013, 20 pages.
U.S. Appl. No. 12/613,450: Electronic Terminal Disclaimer filed and approved, filed Jan. 2, 2014, 2 pages.
U.S. Appl. No. 12/613,450: Amendment After Final or Under 37CFR 1.312, dated Jan. 14, 2014, 2 Pages.
U.S. Appl. No. 12/613,450: Issue Notification, filed Jan. 22, 2014, 1 Page.
U.S. Appl. No. 14/149,749, filed Jan. 7, 2014, 59 Pages.
U.S. Appl. No. 14/149,749: Notice to File Missing Parts and Filing Receipt, filed Jan. 23, 2014, 6 Pages.
U.S. Appl. No. 14/149,749: Applicant Response to Pre-exam Formalities Notice, filed May 23, 2014 12 Pages.
U.S. Appl. No. 14/149,749: Applicant Response to Pre-Exam Formalities Notice, filed Aug. 25, 2014, 103 Pages.
U.S. Appl. No. 14/149,749, filed Sep. 4, 2014, 3 Pages.
U.S. Appl. No. 14/149,749: Notice of Publication, filed Dec. 11, 2014, 1 page.
U.S. Appl. No. 14/149,749: Electronic Terminal Disclaimer Filed and Approved filed Feb. 23, 2015.
U.S. Appl. No. 14/149,749: Examiner Initiated Interview Summary, dated Feb. 24, 2015, 2 pages.
U.S. Appl. No. 14/149,749: Notice of Allowance and Fees and Examiner Search, dated Apr. 17, 2015, 30 pages.
U.S. Appl. No. 14/149,749: Amendment after Notice of Allowance, filed May 27, 2015, 10 pages.
U.S. Appl. No. 14/149,749: Issue Fee Payment, filed May 27, 2015, 1 page.
U.S. Appl. No. 14/149,749: Electronic Terminal Disclaimer Filed and Approved, filed May 27, 2015, 3 pages.
U.S. Appl. No. 14/149,749: Response to Amendment under Rule 312, filed May 29, 2015, 1 page.
U.S. Appl. No. 14/149,749: Response to Amendment under Rule 312, filed Jun. 1, 2015, 3 pages.

(56) References Cited

OTHER PUBLICATIONS

U.S. Appl. No. 14/149,749: Issue Notification, filed Jun. 17, 2015, 1 page.
U.S. Appl. No. 14/726,192, filed May 29, 2015, 39 pages.
U.S. Appl. No. 14/726,192, filed Jun. 9, 2015, 3 pages.
U.S. Appl. No. 14/726,192: Notice to File Missing Parts, filed Jun. 9, 2015, 2 pages.
U.S. Appl. No. 14/726,192: Applicant Response to Pre-Exam Formalities Notice and Amendments, filed Aug. 12, 2015, 114 pages.
U.S. Appl. No. 14/726,192, filed Aug. 20, 2015, 3 pages.
U.S. Appl. No. 14/726,192: Electronic Terminal Disclaimer Filed and Approved, filed Nov. 20, 2015, 3 pages.
U.S. Appl. No. 14/726,192: Notice of Publication, filed Nov. 27, 2015, 1 page.
U.S. Appl. No. 14/726,192: Issue Fee Payment and Amendment after Notice of Allowance, dated Jul. 18, 2016, 13 pages.
U.S. Appl. No. 14/726,192: Response to Amendment under Rule 312, filed Jul. 21, 2016, 1 page.
U.S. Appl. No. 14/726,192: Response to Amendment under Rule 312, filed Jul. 22, 2016, 2 pages.
U.S. Appl. No. 14/726,192: Issue Notification, filed Aug. 3, 2016, 1 page.
U.S. Appl. No. 15/240,964: Application and Preliminary Amendments as filed Aug. 18, 2016, 70 pages.
U.S. Appl. No. 15/240,964, filed Aug. 31, 2016, 3 pages.
U.S. Appl. No. 15/240,964: Notice of Publication, filed Dec. 8, 2016.
U.S. Appl. No. 15/240,964: Non-Final Rejection, dated Mar. 14, 2017, 23 pages.
U.S. Appl. No. 15/240,964: Amendment/Req. Reconsideration—After Non-Final Reject, dated Jun. 14, 2017, 27 pages.
U.S. Appl. No. 15/240,964: Final Rejection, dated Aug. 9, 2017, 25 pages.
U.S. Appl. No. 15/240,964: After Final Consideration Program Request, filed Oct. 10, 2017, 30 pages.
U.S. Appl. No. 15/240,964: Advisory Action, dated Oct. 30, 2017, 3 pages.
U.S. Appl. No. 15/240,964: RCE and Amendments, dated Nov. 9, 2017, 31 pages.
U.S. Appl. No. 15/240,964: Non-Final Rejection, dated Jul. 30, 2018, 32 pages.
U.S. Appl. No. 11/320,538, filed Dec. 27, 2005, 76 pages.
U.S. Appl. No. 11/320,538: Notice of Missing Parts filed Feb. 2, 2006, 2 pages.
U.S. Appl. No. 11/320,538: Response to Missing Parts filed Aug. 2, 2006, 36 pages.
U.S. Appl. No. 11/320,538: Non-final Office Action dated Apr. 1, 2009, 27 pages.
U.S. Appl. No. 11/320,538: Amendment filed Jul. 1, 2009, 54 pages.
U.S. Appl. No. 11/320,538: Final Office Action dated Nov. 2, 2009, 29 pages.
U.S. Appl. No. 11/320,538: Response to Final Office Action filed Jan. 4, 2010, 23 pages.
U.S. Appl. No. 11/320,538: Advisory Action dated Jan. 19, 2010, 3 pages.
U.S. Appl. No. 11/320,538: RCE and Amendment filed Apr. 2, 2010, 26 pages.
U.S. Appl. No. 11/320,538: Non-Final Office Action dated Jun. 9, 2010, 24 pages.
U.S. Appl. No. 11/320,538: Office action dated Dec. 22, 2010, 10 pages.
U.S. Appl. No. 11/320,538: Notice of Appeal, filed May 23, 2011, 6 pages.
U.S. Appl. No. 11/320,538: Pre-brief appeal conference decision filed Jun. 30, 2011, 2 pages.
U.S. Appl. No. 11/320,538: Request for Continued Examination dated Dec. 23, 2011, 21 pages.
U.S. Appl. No. 11/320,538: Non-Final Office Action, dated Dec. 19, 2012, 12 pages.
U.S. Appl. No. 11/320,538: Response to Non-final office action, dated Apr. 17, 2013, 20 pages.
U.S. Appl. No. 11/320,538: Notice of allowance, dated Aug. 1, 2013, 25 pages.
U.S. Appl. No. 11/320,538: Issue fee payment, filed Nov. 1, 2013, 7 pages.
U.S. Appl. No. 11/320,538: Rule 312 amendment, filed Nov. 19, 2013, 20 pages.
U.S. Appl. No. 11/320,538: Issue Notification, filed Dec. 4, 2013, 1 page.
U.S. Appl. No. 14/086,741, filed Dec. 12, 2013, 77 Pages.
U.S. Appl. No. 14/086,741: Filing Receipt and Notice to File Missing Parts, filed Dec. 12, 2013, 6 Pages.
U.S. Appl. No. 14/086,741: Applicant Response to Pre-Exam Formalities Notice, filed Jun. 12, 2014, 60 Pages.
U.S. Appl. No. 14/086,741, filed Jun. 17, 2014, 3 Pages.
U.S. Appl. No. 14/086,741: Notice of Publication, filed Sep. 25, 2014, 1 Page.
U.S. Appl. No. 14/086,741: Terminal Disclaimer as filed Sep. 29, 2014, 1 Page.
U.S. Appl. No. 14/086,741: Terminal Disclaimer Review Decision, filed Sep. 30, 2014, 1 Page.
U.S. Appl. No. 14/086,741: Notice of Allowance and Fees and Examiner Summary, dated Oct. 3, 2014, 21 pages.
U.S. Appl. No. 14/086,741: Notice of Allowance and Fees Due, filed Oct. 3, 2014, 22 pages.
U.S. Appl. No. 14/086,741: Amendment after Notice of Allowance, filed Jan. 5, 2015, 14 pages.
U.S. Appl. No. 14/086,741: Issue Fee Payment, filed Jan. 5, 2015, 1 page.
U.S. Appl. No. 14/086,741: Response to Amendment under Rule 312, filed Jan. 22, 2015, 2 pages.
U.S. Appl. No. 14/086,741: Notice of Allowance and Fees and Examiner Search strategy, dated Mar. 16, 2015, 40 pages.
U.S. Appl. No. 14/086,741: Issue Notification, filed Apr. 1, 2015, 1 page.
U.S. Appl. No. 14/596,154, filed Jan. 13, 2015, 60 pages.
U.S. Appl. No. 14/596,154, filed Jan. 27, 2015, 3 pages.
U.S. Appl. No. 14/596,154: Notice to File Missing Parts, filed Jan. 27, 2015, 3 pages.
U.S. Appl. No. 14/596,154: Applicant Response to Pre Exam Formalities Notice with Preliminary Amendments, filed Mar. 27, 2015, 85 pages.
U.S. Appl. No. 14/596,154, filed Apr. 2, 2015, 3 pages.
U.S. Appl. No. 14/596,154: Notice of Publication, filed Jul. 9, 2015, 1 page.
U.S. Appl. No. 14/596,154: Electronic Terminal Disclaimer Filed and Approved, filed Nov. 20, 2015, 3 pages.
U.S. Appl. No. 14/596,154: Non-Final Rejection, dated Sep. 21, 2017, 19 pages.
U.S. Appl. No. 14/596,154: Amendment/Req. Reconsideration—After Non-Final Reject, dated Dec. 21, 2017, 37 pages.
U.S. Appl. No. 14/596,154: Notice of Allowance and Fees Due, dated May 2, 2018, 8 pages.
U.S. Appl. No. 14/596,154: Issue Notification, filed Aug. 21, 2018, 1 page.
U.S. Appl. No. 11/361,500, filed Feb. 23, 2006, 72 pages.
U.S. Appl. No. 11/361,500: Notice to file missing parts filed Mar. 23, 2006, 2 pages.
U.S. Appl. No. 11/361,500: Response to Notice to File Missing Parts filed Jul. 19, 2006, 27 pages.
U.S. Appl. No. 11/361,500: Notice of Publication filed Nov. 16, 2006, 1 page.
U.S. Appl. No. 11/361,500: Office Action dated May 27, 2009, 18 pages.
U.S. Appl. No. 11/361,500: Response to Office Action dated Aug. 27, 2009, 34 pages.
U.S. Appl. No. 11/361,500: Notice of Allowance dated Dec. 11, 2009, 8 pages.
U.S. Appl. No. 11/361,500: Issue Fee Payment and Rule 312 Amendment filed Jan. 6, 2010, 28 pages.
U.S. Appl. No. 11/361,500: Response to Rule 312 Amendment filed Jan. 25, 2010, 4 pages.

(56) References Cited

OTHER PUBLICATIONS

U.S. Appl. No. 11/361,500: Issue Notification filed Feb. 24, 2010, 1 page.
U.S. Appl. No. 12/702,243: Continuation Application with Preliminary Amendment filed Feb. 8, 2010, 83 pages.
U.S. Appl. No. 12/702,243: Notice of Missing Parts filed Feb. 25, 2010, 2 pages.
U.S. Appl. No. 12/702,243: Response to Missing Parts filed Apr. 26, 2010, 8 pages.
U.S. Appl. No. 12/702,243, filed May 4, 2010, 3 pages.
U.S. Appl. No. 12/702,243: Notice of Publication filed Aug. 12, 2010, 1 page.
U.S. Appl. No. 12/702,243: Non-Final rejection, dated Aug. 30, 2012, 8 pages.
U.S. Appl. No. 12/702,243: Amendment, dated Nov. 20, 2012, 14 pages.
U.S. Appl. No. 12/702,243: Terminal Disclaimer, filed Jan. 2, 2013, 5 pages.
U.S. Appl. No. 12/702,243: Terminal Disclaimer decision, filed Jan. 4, 2013, 1 pagel.
U.S. Appl. No. 12/702,243: Notice of allowance and fees due and examiner interview summary, dated Jan. 10, 2013, pages.
U.S. Appl. No. 12/702,243: Issue notification, filed Apr. 24, 2013, 1 page.
U.S. Appl. No. 13/860,482, filed Apr. 10, 2013, 98 Pages.
U.S. Appl. No. 13/860,482: Notice to File Missing Parts and Filing Receipt, filed May 21, 2013, 5 Pages.
U.S. Appl. No. 13/860,482: Applicant Response to Pre-Exam Formalities Notice, filed Oct. 22, 2013, 3 Pages.
U.S. Appl. No. 13/860,482: Notice of Publication, filed Feb. 6, 2014, 1 Page.
U.S. Appl. No. 13/860,482: Non-Final Office Action, dated Jun. 9, 2014, 11.
U.S. Appl. No. 13/860,482: Non-Final Office Action Response, dated Sep. 8, 2014, 19 Pages.
U.S. Appl. No. 13/860,482: Terminal Disclaimer Review Decision, filed Sep. 9, 2014, 1 page.
U.S. Appl. No. 13/860,482: Terminal Disclaimer Filed, filed Oct. 8, 2014, 1 page.
U.S. Appl. No. 13/860,482: Terminal Disclaimer Review Decision, filed Oct. 9, 2014, 1 page.
U.S. Appl. No. 13/860,482: Notice of Allowance and Fees Due, dated Nov. 5, 2014, 8 Pages.
U.S. Appl. No. 13/860,482: Issue Fee Payment and Rule 312 Amendments, filed Feb. 4, 2015, 4 pages.
U.S. Appl. No. 13/860,482: Issue Notification, filed Mar. 4, 2015, 1 page.
U.S. Appl. No. 14/614,292, filed Feb. 4, 2015, 76 pages.
U.S. Appl. No. 14/614,292: Notice to File Missing Parts and Filing Receipt, filed Feb. 20, 2015, 5 pages.
U.S. Appl. No. 14/614,292: Applicant Response to Pre-Exam Formalities Notice and Amendments, filed Apr. 17, 2015, 30 pages.
U.S. Appl. No. 14/614,292, filed Apr. 24, 2015, 3 pages.
U.S. Appl. No. 14/614,292: Notice of Publication, filed Aug. 6, 2015, 1 page.
U.S. Appl. No. 14/614,292: Electronic Terminal Disclaimer Filed and Approved, filed Nov. 20, 2015, 3 pages.
U.S. Appl. No. 14/614,292: Non-Final Rejection, dated May 19, 2016, 10 pages.
U.S. Appl. No. 14/614,292: Amendment/Req. Reconsideration—After Non-Final Rejection, dated Aug. 18, 2016, 20 pages.
U.S. Appl. No. 14/614,292: Notice of Allowance and Fees, dated Sep. 21, 2016, 8 pages.
U.S. Appl. No. 14/614,292: Issue Fee Payment and Amendment after Notice of Allowance, dated Dec. 21, 2016, 4 pages.
U.S. Appl. No. 14/614,292: Issue Notification, filed Jan. 18, 2017, 1 page.
U.S. Appl. No. 15/411,823, filed Jan. 20, 2017, 77 pages.
U.S. Appl. No. 15/411,823: Preliminary Amendment, dated Jan. 20, 2017, 25 pages.
U.S. Appl. No. 15/411,823, filed Jan. 31, 2017, 3 pages.
U.S. Appl. No. 15/411,823: Notice of Publication, filed May 11, 2017, 1 page.
U.S. Appl. No. 15/411,823: Non-Final Rejectioin, dated Jan. 25, 2018, 10 pages.
U.S. Appl. No. 15/411,823: Amendment/Req. Reconsidertion—After Non-Final Rejection, dated Apr. 24, 2018, 18 pages.
U.S. Appl. No. 15/411,823: Terminal Disclaimer-Filed and Approved, filed Apr. 24, 2018, 3 pages.
U.S. Appl. No. 15/411,823: Notice of Allowance and Fees Due, dated Jul. 13, 2018, 8 pages.
U.S. Appl. No. 11/412,417, filed Apr. 26, 2006, 96 pages.
U.S. Appl. No. 11/412,417: Notice of Missing Parts filed May 19, 2006, 2 pages.
U.S. Appl. No. 11/412,417: Response to Notice of Missing Parts filed Jul. 19, 2006, 14 pages.
U.S. Appl. No. 11/412,417: Non-final Office Action dated Apr. 1, 2008, 53 pages.
U.S. Appl. No. 11/412,417: Amendment filed Aug. 1, 2008, 34 pages.
U.S. Appl. No. 11/412,417: Final Office Action dated Nov. 13, 2008, 40 pages.
U.S. Appl. No. 11/412,417: RCE and Amendment filed May 12, 2009, 36 pages.
U.S. Appl. No. 11/412,417: Non-final Office Action dated Jun. 30, 2009, 141 pages.
U.S. Appl. No. 11/412,417: Examiner Interview Summary dated Oct. 30, 2009, 3 pages.
U.S. Appl. No. 11/412,417: Amendment filed Oct. 30, 2009, 33 pages.
U.S. Appl. No. 11/412,417: Final Office Action dated Jan. 4, 2010, 37 pages.
U.S. Appl. No. 11/412,417: RCE with Amendment filed May 4, 2010, 27 pages.
U.S. Appl. No. 11/412,417: Supplemental Office Action Response dated Jun. 22, 2010, 22 pages.
U.S. Appl. No. 11/412,417: Notice of Allowance and bibliographic data sheet dated Jul. 8, 2010, 9 pages.
U.S. Appl. No. 11/412,417: RCE filed Oct. 5, 2010, 4 pages.
U.S. Appl. No. 11/412,417: Notice of Allowance and bibliographic data sheet dated Oct. 26, 2010, 4 pages.
U.S. Appl. No. 11/412,417: Issue Fee Payment and Comments on Reasons for Allowance dated Jan. 26, 2011, 6 pages.
U.S. Appl. No. 11/412,417: Issue Notification filed Feb. 9, 2011, 1 page.
U.S. Appl. No. 13/030,084, filed Feb. 17, 2011, 103 pages.
U.S. Appl. No. 13/030,084: Filing receipt and Notice to File Missing parts filed Mar. 3, 2011, 6 pages.
U.S. Appl. No. 13/030,084: Response to Notice to File Missing Parts, filed Aug. 3, 2011, 23 pages.
U.S. Appl. No. 13/030,084: Updated filing receipt, filed Aug. 11, 2011, 3 pages.
U.S. Appl. No. 13/030,084: Non-Final Rejection dated Oct. 26, 2011, 34 pages.
U.S. Appl. No. 13/030,084: Notice of Publication filed Nov. 17, 2011, 1 page.
U.S. Appl. No. 13/030,084: Amendment, dated Jan. 26, 2012, 35 pages.
U.S. Appl. No. 13/030,084: Notice regarding non-compliant amendment, dated Jan. 31, 2012, 4 pages.
U.S. Appl. No. 13/030,084: Amendment, dated Feb. 9, 2012, 35 pages.
U.S. Appl. No. 13/030,084: Final Rejection, dated Mar. 28, 2012, 62 pages.
U.S. Appl. No. 13/030,084: Amendment after final, dated Jun. 14, 2012, 88 pages.
U.S. Appl. No. 13/030,084: Advisory Action, dated Jun. 26, 2012, 4 pages.
U.S. Appl. No. 13/030,084: RCE, filed Jul. 23, 2012, 89 pages.
U.S. Appl. No. 13/030,084: Notice regarding non-compliant amendment, dated Jul. 25, 2012, 2 pages.
U.S. Appl. No. 13/030,084: Amendment, dated Jan. 2, 2013, 40 pages.

(56) References Cited

OTHER PUBLICATIONS

U.S. Appl. No. 13/030,084: Refund request, filed Jan. 23, 2013 17 pages.
U.S. Appl. No. 13/030,084: Non-Final office action, dated Apr. 30, 2013, 39 pages.
U.S. Appl. No. 13/030,084: Response to non-final office action, dated Jul. 30, 2013, 28 pages.
U.S. Appl. No. 13/030,084: Non-final office action, dated Oct. 10, 2013, 44 pages.
U.S. Appl. No. 13/030,084: Response after Non-Final Reject, dated Jan. 2, 2014, 1 Page.
U.S. Appl. No. 13/030,084: Final Rejection, dated Mar. 19, 2014, 41 Pages.
U.S. Appl. No. 13/030,084: Amendment Submitted/Entered with Filing of CPA/RCE, dated May 19, 2014, 38 Pages.
U.S. Appl. No. 13/030,084: Advisory Action, dated Jun. 6, 2014, 4 Pages.
U.S. Appl. No. 13/030,084: Applicant Initiated Interview Summary, filed Jul. 1, 2014, 3 Pages.
U.S. Appl. No. 13/030,084: Request for Continued Examination, filed Aug. 15, 2014.
U.S. Appl. No. 13/030,084: Non-Final Rejection and Examiner's Search, dated Mar. 24, 2015, 24 pages.
U.S. Appl. No. 13/030,084: Amendment/Req. Reconsideration After Non-Final Rejection, filed Jun. 24, 2015, 28 pages.
U.S. Appl. No. 13/030,084: Terminal Disclaimer filed and Approved, filed Sep. 10, 2015, 3 pages.
U.S. Appl. No. 13/030,084: Notice of Allowance and Fees, dated Sep. 17, 2015, 24 pages.
U.S. Appl. No. 13/030,084: Issue Fee Payment and Amendment, dated Dec. 10, 2015, 4 pages.
U.S. Appl. No. 14/968,429, filed Dec. 14, 2015.
U.S. Appl. No. 14/968,429: Filing Receipt, filed Jan. 4, 2016, 3 pages.
U.S. Appl. No. 14/968,429: Applicant Response to Pre-Exam Formalities Notice, filed Jan. 14, 2016, 35 pages.
U.S. Appl. No. 14/968,429, filed Jan. 21, 2016, 3 pages.
U.S. Appl. No. 14/968,429: Notice of Publication, filed Apr. 28, 2016, 1 page.
U.S. Appl. No. 14/968,429: Non-Final Rejection, dated May 15, 2017, 8 pages.
U.S. Appl. No. 14/968,429: Amendment/Req. Reconsideration—After Non-Final Reject, dated Aug. 9, 2017, 19 pages.
U.S. Appl. No. 14/968,429: Final Rejection, dated Oct. 24, 2017, 10 pages.
U.S. Appl. No. 14/968,429: Response After Final Action, dated Dec. 26, 2017, 28 pages.
U.S. Appl. No. 14/968,429: Advisory Action, dated Jan. 11, 2018, 5 pages.
U.S. Appl. No. 14/968,429: Terminal Disclaimer-Filed and Approved, filed Feb. 7, 2018, 3 pages.
U.S. Appl. No. 14/968,429: Response After Final Action, dated Feb. 7, 2018, 13 pages.
U.S. Appl. No. 14/968,429: Notice of Allowance and Fees Due, dated Feb. 26, 2018, 8 pages.
U.S. Appl. No. 14/968,429: Notice of Allowance and Fees Due, dated Mar. 19, 2018, 6 pages.
U.S. Appl. No. 14/968,429: Amendment after Notice of Allowance, dated May 31, 2018, 12 pages.
U.S. Appl. No. 14/968,429: Amendment after Notice of Allowance, dated Jun. 13, 2018, 12 pages.
U.S. Appl. No. 14/968,429: Response to Amendment under Rule 312, filed Jul. 10, 2018, 2 pages.
U.S. Appl. No. 14/968,429: Response to Amendment under Rule 312, filed Jul. 23, 2018, 2 pages.
U.S. Appl. No. 14/968,429: Issue Notification, filed Aug. 1, 2018, 1 page.
U.S. Appl. No. 16/048,061, filed Jul. 27, 2018, 101 pages.
U.S. Appl. No. 16/048,061: Notice to File Missing Parts, filed Aug. 13, 2018, 2 pages.
U.S. Appl. No. 16/048,061, filed Aug. 13, 2018, 4 pages.
U.S. Appl. No. 11/480,094, filed Jun. 29, 2006, 125 pages.
U.S. Appl. No. 11/480,094: Notice to File Corrected Application Papers filed Aug. 2, 2006, 2 pages.
U.S. Appl. No. 11/480,094: Response to Notice to File Corrected Appliccation Papers filed Nov. 2, 2006, 32 pages.
U.S. Appl. No. 11/480,094, filed Dec. 7, 2006, 3 pages.
U.S. Appl. No. 11/480,094: Non-final Office Action dated Nov. 7, 2008, 28 pages.
U.S. Appl. No. 11/480,094: Amendment filed May 7, 2009, 37 pages.
U.S. Appl. No. 11/480,094: Final Office Action dated Jul. 28, 2009, 16 pages.
U.S. Appl. No. 11/480,094: RCE with Amendment filed Dec. 28, 2009, 39 pages.
U.S. Appl. No. 11/480,094: Office Action dated Dec. 15, 2010, 15 pages.
U.S. Appl. No. 11/480,094: Office Action response, dated May 16, 2011, 29 pages.
U.S. Appl. No. 11/480,094: Final Office Action, dated Aug. 1, 2011, 13 pages.
U.S. Appl. No. 11/480,094: Amendment after final dated Nov. 1, 2011, 32 pages.
U.S. Appl. No. 11/480,094: Advisory Action dated Nov. 14, 2011, 3 pages.
U.S. Appl. No. 11/480,094: Notice of Appeal filed Nov. 28, 2011, 1 page.
U.S. Appl. No. 11/480,094: Abandonment, filed Jul. 31, 2012, 2 pages.
U.S. Appl. No. 14/870,744: Response to Amendment under Rule 312, filed Jan. 9, 2019, 2 pages.
U.S. Appl. No. 14/870,744: Notice of Allowance and Fees Due, dated Mar. 12, 2019, 7 pages.
U.S. Appl. No. 14/870,744: Issue Notification, filed Mar. 20, 2019, 1 page.
U.S. Appl. No. 16/209,872: Applicant Response to Pre-Exam Formalities Notice, filed Feb. 21, 2019, 17 pages.
U.S. Appl. No. 16/209,872, filed Feb. 26, 2019, 3 pages.
U.S. Appl. No. 15/043,267: Non-Final Rejection, dated Apr. 2, 2019, 21 pages.
U.S. Appl. No. 15/250,118: Issue Fee Payment, filed Apr. 5, 2019, 20 pages.
U.S. Appl. No. 16/379,674, filed Apr. 9, 2019, 83 pages.
U.S. Appl. No. 16/379,674, filed Apr. 24, 2019, 4 pages.
U.S. Appl. No. 15/802,348: Non-Final Rejection, dated Feb. 11, 2019, 18 pages.
U.S. Appl. No. 15/802,348: Amendment/Req. Reconsideration—After Non-Final Reject, dated May 13, 2019, 22 pages.
U.S. Appl. No. 12/830,236: Notice of Allowance and Fees Due, dated Apr. 2, 2019, 15 pages.
U.S. Appl. No. 14/641,735: Amendment/Req. Reconsideration—After Non-Final Reject, dated Feb. 4, 2019, 27 pages.
U.S. Appl. No. 14/641,735: Notice of Allowance and Fees Due, dated Apr. 15, 2019, 47 pages.
U.S. Appl. No. 15/464,205: Preliminary Amendment, dated Feb. 22, 2019, 11 pages.
U.S. Appl. No. 15/240,964: Notice of Allowance and Fees Due, dated Feb. 21, 2019, 26 pages.
U.S. Appl. No. 16/164,430: Notice of Publication, filed May 2, 2019, 1 page.
U.S. Appl. No. 16/209,872: Amendment After filed Apr. 30, 2021, 11 pages.
U.S. Appl. No. 16/209,872: Notice of Allowance/Allowability dated Jun. 10, 2021, 4 pages.
U.S. Appl. No. 16/379,674: Final Office Action dated Apr. 5, 2021, 21 pages.
U.S. Appl. No. 16/513,021: Non-final Office Action dated May 5, 2021, 36 pages.
U.S. Appl. No. 16/710,731: Non-Final Rejection dated Apr. 21, 2021, 11 pages.
U.S. Appl. No. 16/048,113: Notice of Allowance/Allowability dated Apr. 6, 2021, 75 pages.

(56) References Cited

OTHER PUBLICATIONS

U.S. Appl. No. 16/048,061: Notice of Allowance/Allowability dated Apr. 9, 2021, 33 pages.

* cited by examiner

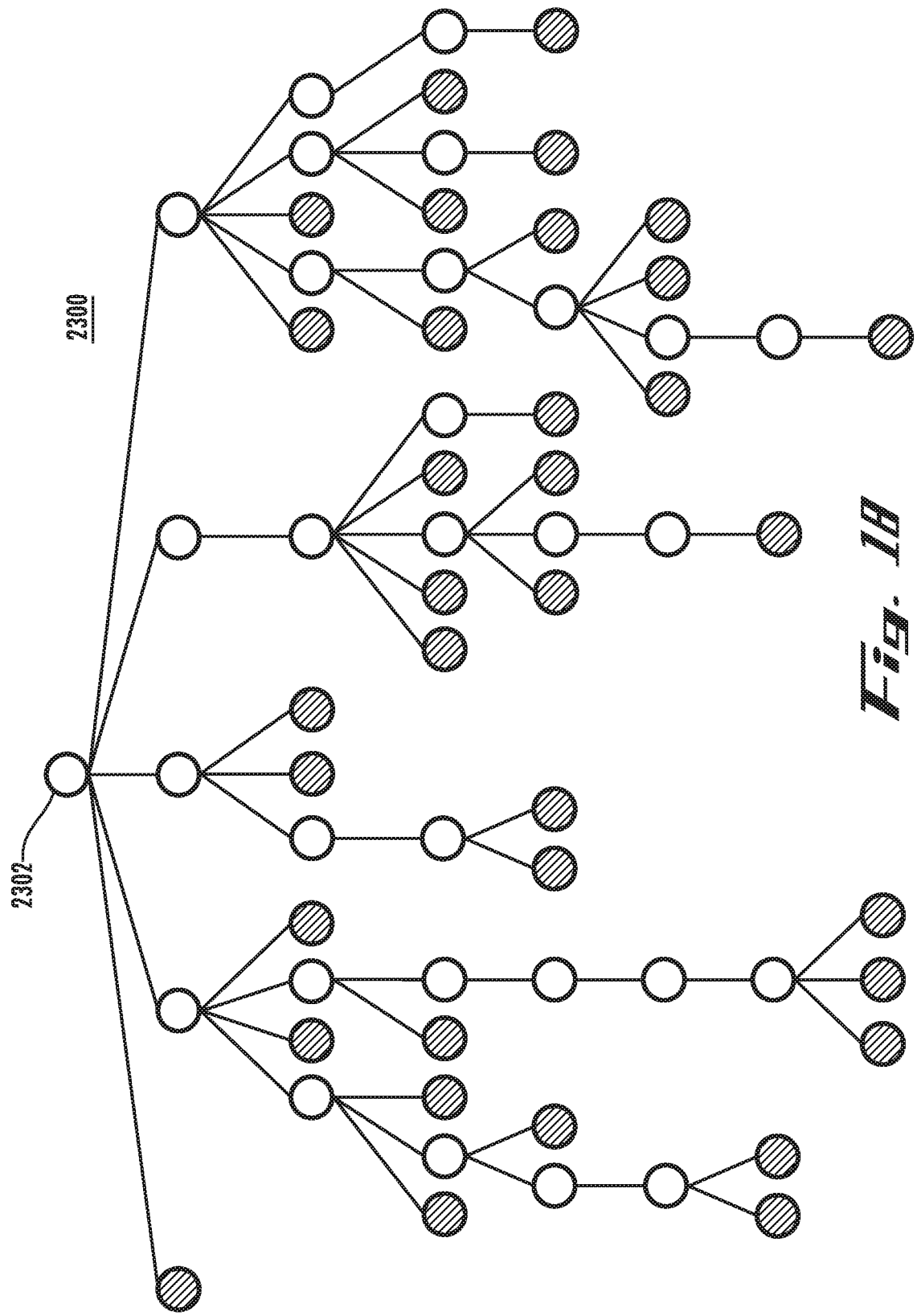

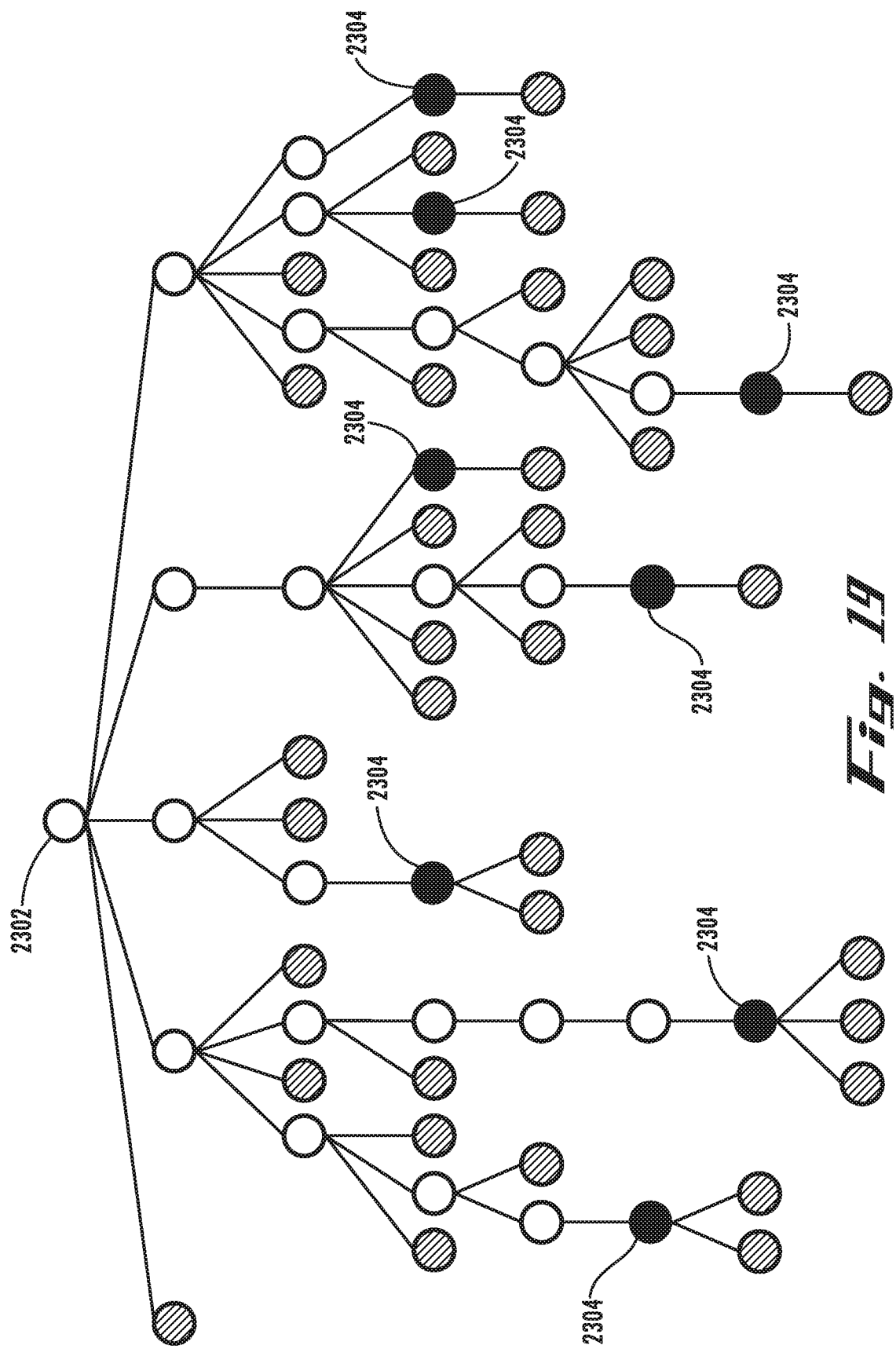

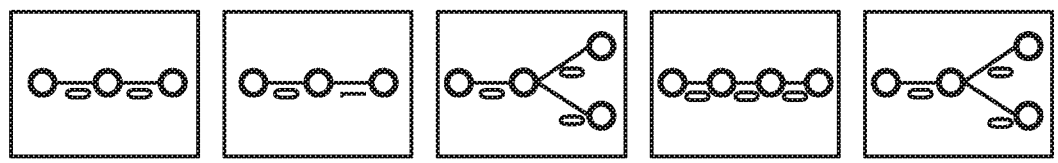
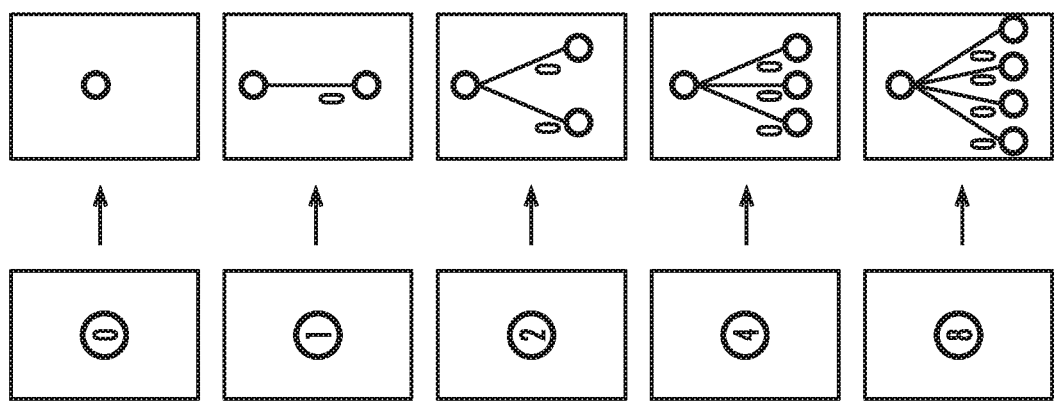
Fig. 2K

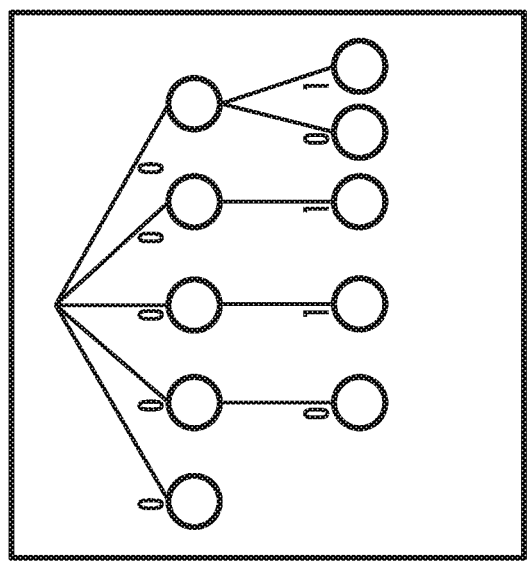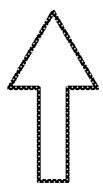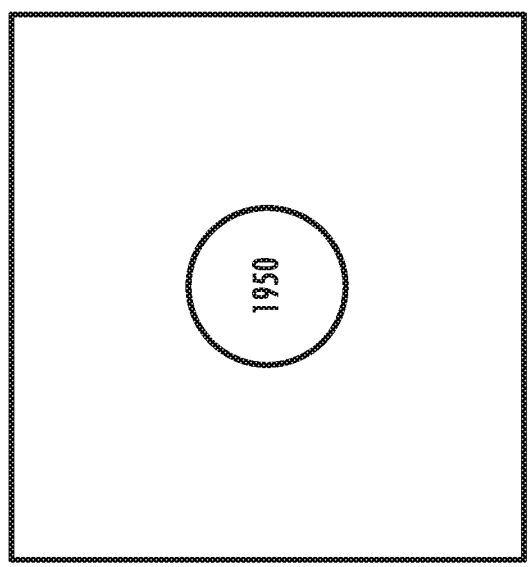
Fig. 26

| Natural # | BEL Trees/Tags | Non-Composite Numerals |
|---|---|---|
| 0 | ○ | ⎯⎯⎯ |
| 1 | ● | ⎯⎯⎯ |
| 2 | ●—0—● | 3 |
| 3 | ●—1—● | 5 |
| 4 | ● with two children (0, 0) | 7 |
| 5 | ●—0—●—0—● | 11 |
| 6 | ● with two children (0, 1) | 13 |

METHOD AND/OR SYSTEM FOR TREE TRANSFORMATION

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIGS. 17-22 are schematic diagrams of trees illustrating a transformation of an unlabeled tree to a BELT according to an embodiment;

FIG. 25 is a table illustrating a particular embodiment of an association between numerals and BELTS and/or portions of BELTs;

FIG. 26 illustrates a representation of node label values as a portion of a BELT according to an embodiment;

FIG. 27 is a table illustrating a particular embodiment of an association between natural numerals and BELTs; and FIG. 28 is a table illustrating a portion of the Kleene enumeration of non-composite numerals.

DETAILED DESCRIPTION

Figure 1:
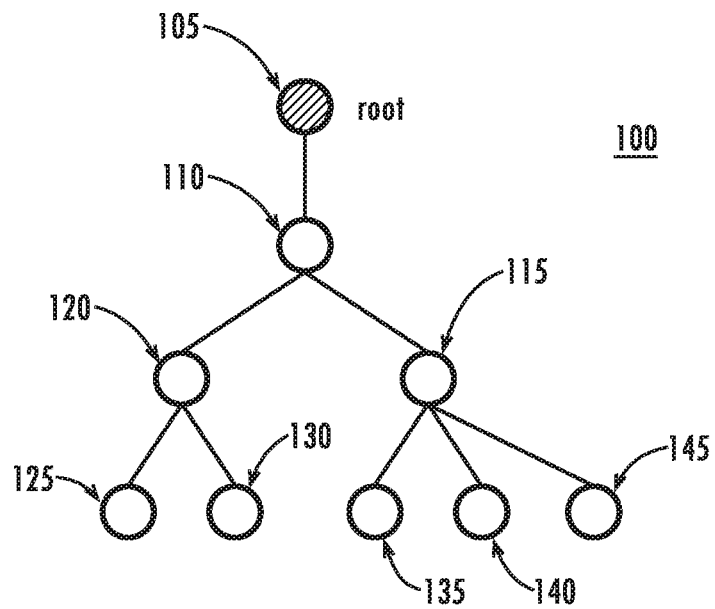
FIG. 1 is a schematic diagram of one embodiment of a tree.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete non-backtracking loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
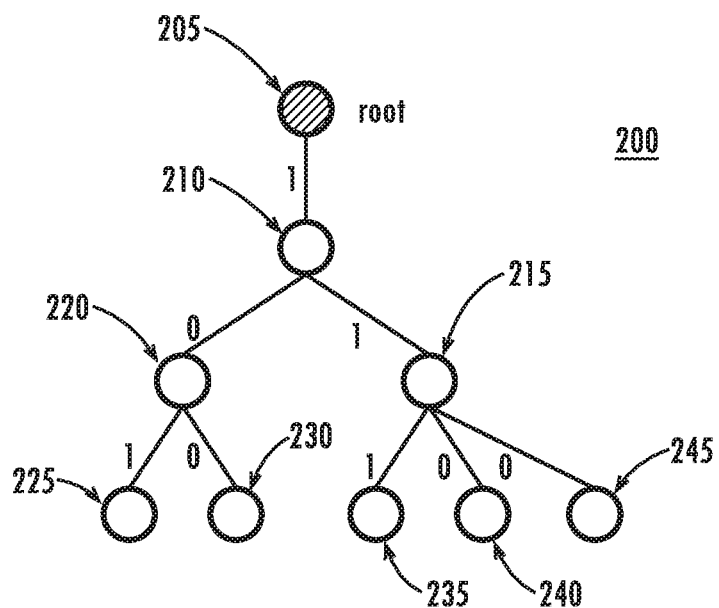
FIG. 2 is a schematic diagram illustrating one embodiment of a binary edge labeled tree (BELT)
Figure 3:
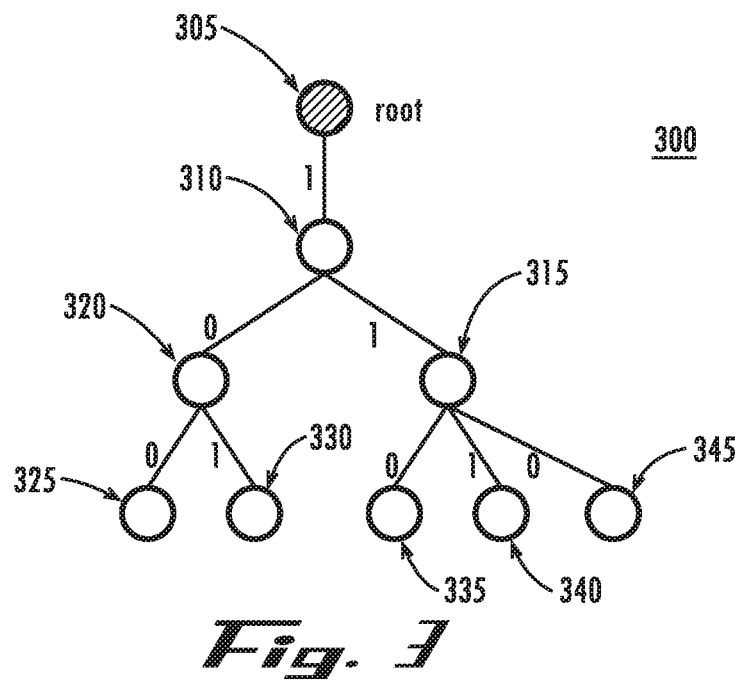
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar or isomorphic to the embodiment of FIG. 2.

Figure 4:
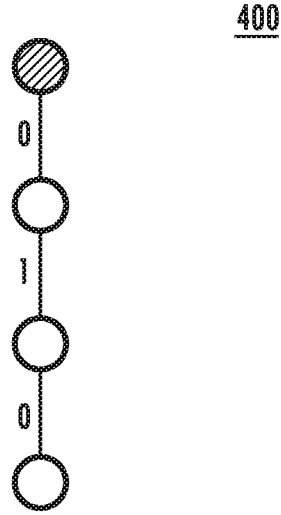
FIG. 4 is a schematic diagram illustrating an embodiment of a binary edge labeled string.

A subset of BELTs may be referred to in this context as binary edge labeled strings (BELSs). One embodiment, 400, is illustrated in FIG. 4. Thus, as illustrated by embodiment 400, this particular binary edge labeled string comprises four nodes and three edges, where the edges are labeled, respectively, binary zero, binary one and binary zero. Thus, a binary edge labeled string comprises a binary edge labeled tree in which each node has no more than two edges. To reiterate, in this context, a string comprises a binary edge labeled string and a tree comprises a binary edge labeled tree if each edge of the string or tree respectively stores a single bit. Likewise, in this context, two nodes are employed to support an edge holding, storing and/or representing a single piece of binary data. At this point, it is worth noting that strings and trees having nodes and edges, such as previously described, may be represented in a computing platform or similar computing device through a data structure or a similar mechanism intended to capture the hierarchical relationship of the data. It is intended that all such embodiments are included within the scope of the claimed subject matter.

In addition to, or as an alternative to storing, holding and/or representing information in edges of a tree in an edge labeled tree, a tree may similarly store, hold and/or represent information in nodes of a tree. Here, such a tree storing, holding and/or representing information in node of a tree may comprise a "node labeled tree" in which information may be stored, held and/or represented in node label values associated with particular nodes. Additionally, a tree storing, holding and/or representing information in nodes and edges may comprise a "feature tree" in which information may be stored, held and/or represented in node label values and/or edge label values. Accordingly, edge labeled trees and node labeled trees comprise particular types of trees in a greater class of trees known as feature trees.

While node and edge labeled trees may be used to express hierarchical data, a tree may not necessarily store, hold and/or represent information in any of its nodes or edges. For example, an "unlabeled tree" may represent hierarchical data without having any information stored, held or represented in any of its edges or nodes (including root nodes and/or terminal nodes). Rather, such hierarchical data may be expressed in how nodes and/or edges in an unlabeled tree may relate to other nodes and/or edges.

According to an embodiment, a "set" may define a collection of unique unordered elements or members. For example, for the purpose of illustration, a set may contain members or elements of a distinct classification, such as the set of all automobiles in a parking lot of a particular color. In a particular embodiment, trees may be classified into sets defined by certain characteristics, such as the set containing node labeled trees, BELTs, unlabeled trees, and the like. However, this is merely an example of how trees may be classified into distinct sets and the claimed subject matter is not limited in this respect.

According to an embodiment, a "transformation" may define a process by which elements of a first set may be mapped into and/or associated with elements of a second set. For example, in a particular embodiment, a transformation may map and/or associate a member of the set of unlabeled trees with a member of the set of node labeled trees. Similarly, according to a particular embodiment, a transformation may map and/or associate a member of the set of node labeled trees with a member of the set of BELTs. Likewise, a transformation may map and/or associate a member of the set of unlabeled trees with a member of the set of BELTs. However, these are merely examples of how a transformation may map and/or associate members of one set to members of another set, and the claimed subject matter is not limited in these respects.

According to an embodiment, a transformation may associate and/or map an element in a first set with an element in a second set as an "elementary equivalent." Here, in a particular embodiment, such a transformation may associate such elementary equivalent elements in different sets in a one-to-one and onto mapping in which the transformation defines for elements in a first set corresponding, unique elementary equivalents in a second set. Similarly, a transformation may also map and/or associate members of the second set to corresponding elementary equivalents in the first set. Examples of a transformations mapping and/or associating elementary equivalent elements of different sets may be found in, for example, *Logical Number Theory, An Introduction*, by Craig Smorynski, p. 305. In a particular embodiment, for example, a transformation may map and/or associate trees of a first type (e.g., a member of the set of unlabeled trees, node labeled trees or BELTs) to elementary equivalent trees of a second type. However, this is merely an example of how a transformation may map and/or associate members of different sets as elementary equivalents, and the claimed subject matter is not limited in these respects.

Also, operations and/or manipulations of elements in a first set may provide elements that are also in the first set. For example, for the purpose of illustration, the addition of positive integers (the first set) to positive integers results in positive integers. According to an embodiment, operations and/or manipulations on a tree of a particular type (e.g., unlabeled tree, node labeled tree or BELT) may result in another tree of the same type, for example.

A transformation of elements in a first set to elementary equivalents in a second set may also map and/or associate results from an operation and/or manipulation of the elements of the first set to elementary equivalents of the results in the second set. For the operation and/or manipulation of the elements in the first set, a corresponding operation and/or manipulation may exist for elements in a second set which are elementary equivalents of the elements of the first set. Here, the corresponding operation and/or manipulation of elements in the second set may provide elementary equivalents of the results of the operation and/or manipulation of the elements in the first set. Continuing with the example of the addition of positive integers, for the purpose of illustration, the set of negative integers may comprise a set of elements that are elementary equivalents of positive integers mapped and/or associated by a transformation comprising multiplication by negative one. Here, addition of negative integers provides a negative integer which may comprise an elementary equivalent of a sum resulting from the addition of positive integers (which themselves comprise elementary equivalents of the added negative integers).

According to an embodiment, an operation and/or manipulation of a first tree of a particular first type (representing hierarchical data) may result in a second tree of the first type. Here, a transformation associating and/or mapping the first tree of the first type to an elementary equivalent first tree of a second type may also map the second tree of the first type to an elementary equivalent second tree of the second type. Here, a corresponding operation and/or manipulation on the first tree of the second type may provide the second tree of the second type. However, these are merely examples of how a transformation may associate and/or map elements of a first set with elements of a second set as elementary equivalents, and the claimed subject matter is not limited in these respects.

Binary edge labeled trees and binary node labeled trees may be employed nearly interchangeably to represent substantially the same hierarchy of data. In particular, a binary node labeled tree may be associated with a binary edge labeled trap in which the nodes of the binary node labeled tree take the same values as the edges of the binary edge labeled tree, except that the root node of the binary node labeled tree may comprise a node having a zero value or a null value. Thus, rather than employing binary edge labeled trees to express hierarchical data, the hierarchical data may alternatively be expressed in corresponding binary node labeled trees.

As discussed above, operations and/or manipulations of trees may correspond with operations and/or manipulations of the hierarchical data represented in such trees. Similarly, operations and/or manipulations of trees of a particular type (e.g., unlabeled trees) may correspond with operations and/or manipulations of elementary equivalent trees of a different type (e.g., node labeled trees and/or BELTs). Here, a transformation may associate and/or map trees of the first type to trees of the second type as elementary equivalents.

Operations on trees may, in some situations, be efficient for processing hierarchical data in the form of a BELT. According to an embodiment, it may be desirable to transform an unlabeled tree to a node labeled tree and/or BELT. Here, the BELT resulting from the transformation may comprise an elementary equivalent of the original unlabeled tree by expressing essentially the same hierarchical data as the unlabeled tree. Accordingly, operations on the hierarchical data expressed in the unlabeled tree may be carried out on the resulting BELT. For example, expressing hierarchical data of an unlabeled tree in a BELT may enable greater efficiency in indexing the hierarchical data for processing. Also, expression of hierarchical data of an unlabeled tree in the form of a BELT may enable an expression of the hierarchical data as a binary string that may use less memory for storage of the hierarchical data, for example. However, these are merely examples of potential or possible advantages to transforming an unlabeled tree to a BELT and the claimed subject matter is not limited in these respects.

In accordance with the claimed subject matter, therefore, any tree, regardless of whether it is binary edge labeled, binary node labeled, non-binary, a feature tree, or otherwise, may be manipulated and/or operated upon. For example, and as shall be described in more detail below, a node labeled tree in which the nodes are labeled with natural numerals or data values may be transformed to a binary edge labeled tree. Furthermore, this may be accomplished with approximately the same amount of storage. For example, for this particular embodiment, this may involve substantially the same amount of node and/or edge data label values.

As previously noted, the claimed subject matter is not limited in scope to this particular example, however, as illustrated in more detail hereinafter, the tree illustrated in FIG. 5 may be transformed to a binary edge labeled tree through a sequence of processing depicted here as graph operations, although such a transformation may alternatively be implemented by operations implemented otherwise, one such example being by a computing platform, for example. Alternatively, it may be desirable, depending upon the particular embodiment, to transform trees to, for example, binary node labeled trees. Likewise, other embodiments in which trees of one form are transformed to trees of another form are also included within the scope of the claimed subject. In this example, a particular tree, embodiment 1100, is illustrated in FIG. 5, comprises a node labeled tree rather than an edge labeled tree.

According to an embodiment, trees or portions of trees may be represented by natural numerals according to an association of trees and natural numerals. Without belaboring the present discussion, additional descriptions of how natural numerals may be associated with trees is discussed in greater detail below and in U.S. patent application Ser. No. 11/005,859, filed on Dec. 6, 2004, by J. J. LeTourneau, titled, "Manipulating Sets of Hierarchical Data," assigned to the assignee of the presently claimed subject matter. It should be understood, however, that while the particular embodiments illustrated are directed to particular associations of numerals and trees, there may be many associations of trees to numerals according to corresponding particular "association embodiments," and the claimed subject matter is not limited to any such particular association.

According to an embodiment, a transformation of node labeled tree 1100 to a BELT makes use of an association of BELTs and/or portions of BELTS with numerals according to a particular association embodiment. As illustrated below, according to a particular embodiment, node label values of node labeled tree 1100 may express essentially the same information of BELTs or portions of a BELT. Accordingly, such a transformation may comprise, at least in part, replacing at least some of the node label values with corresponding BELTs or portions of BELTs.

Figure 5:
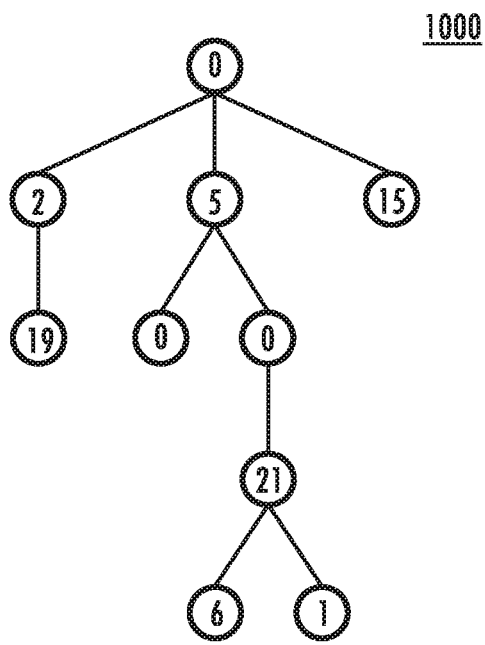
FIG. 5 is a schematic diagram of an embodiment of a node labeled tree.
Figure 6:
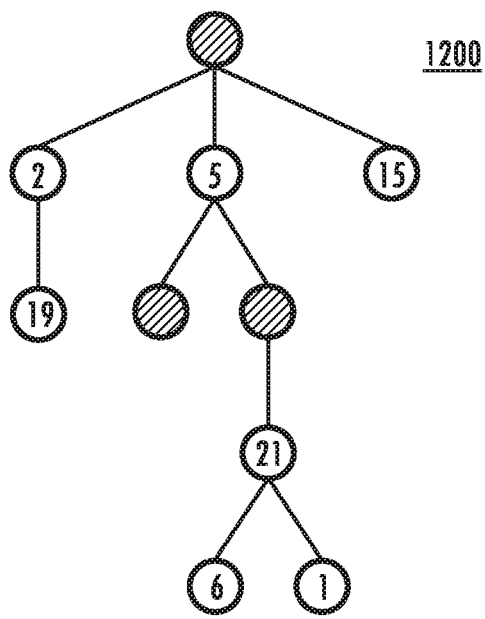
FIGS. 6-10 are schematic diagrams illustrating a process to transform a node labeled tree to a BELT according to an embodiment.
Figure 7:
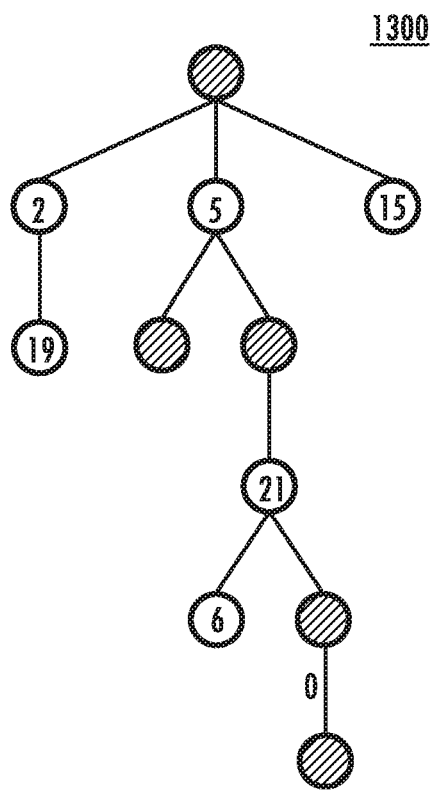
Figure 8:
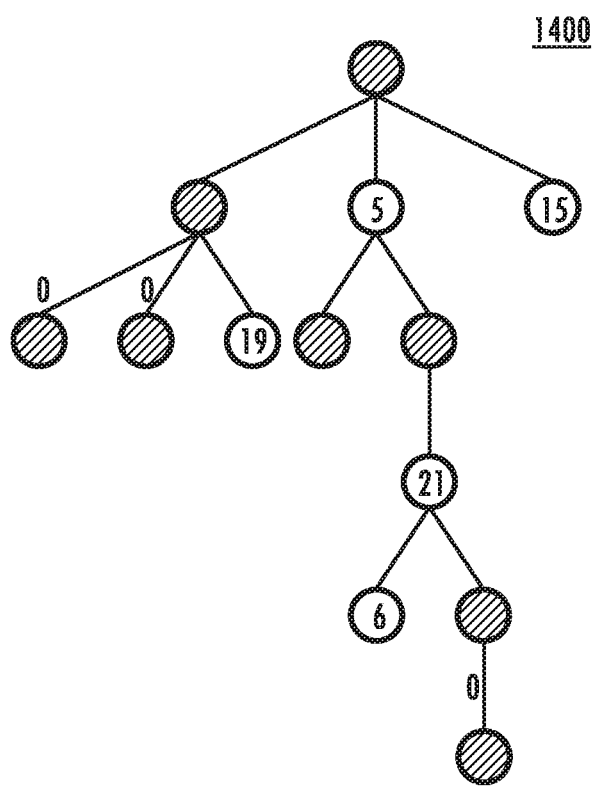

Referring now to FIG. 5, node values are deleted for those nodes storing the value zero. This is illustrated, for example, in FIG. 6. Node values are also deleted for the nodes storing the value one. In this case, a new single unlabeled node is attached to those nodes that had stored the value one, and the edge between the prior node and the new node is labeled with a zero value. This is illustrated, for example, in FIG. 7. For nodes with a label value k that is a power of 2, and larger than one, the node label value is deleted and $(\log_2(k)+1)$ new nodes are attached, labeling the edge between the new nodes and the old nodes with a zero value. This, for example, is illustrated in FIG. 8.

Figure 9:
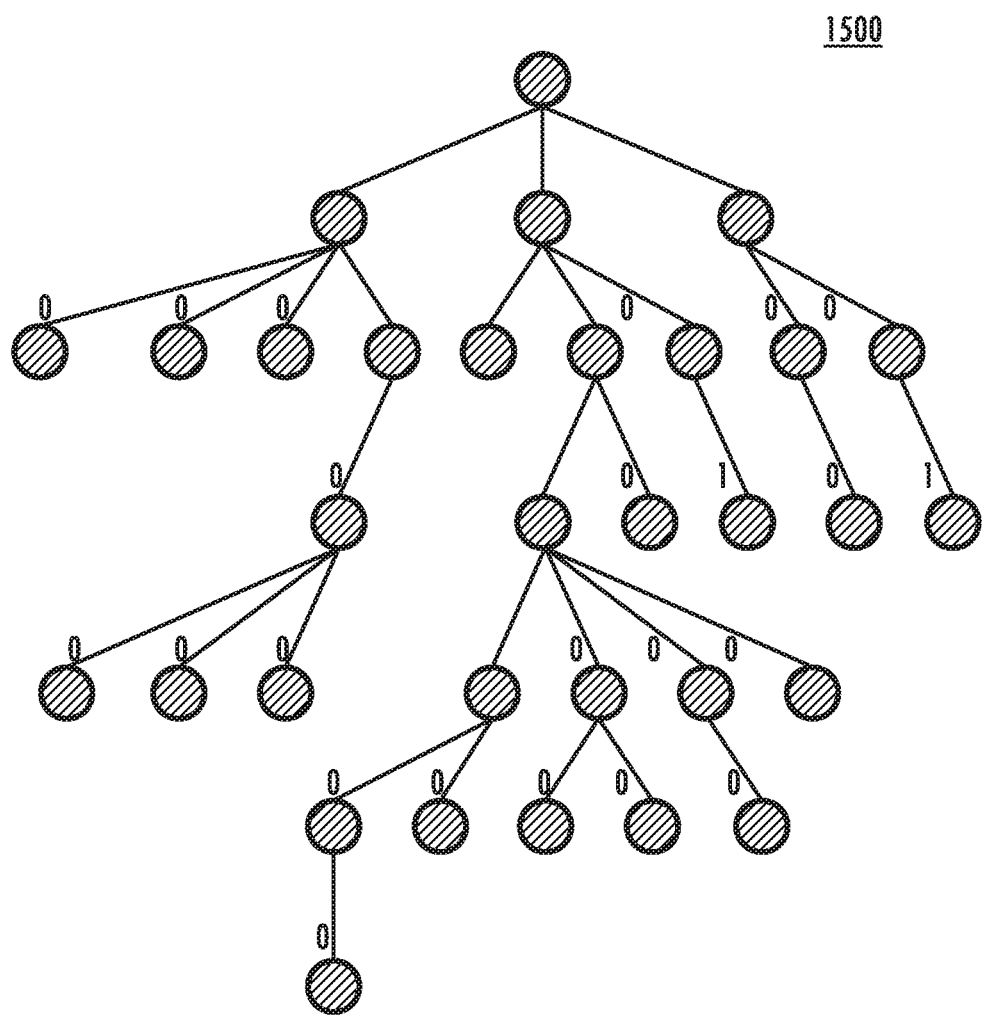
Figure 10:
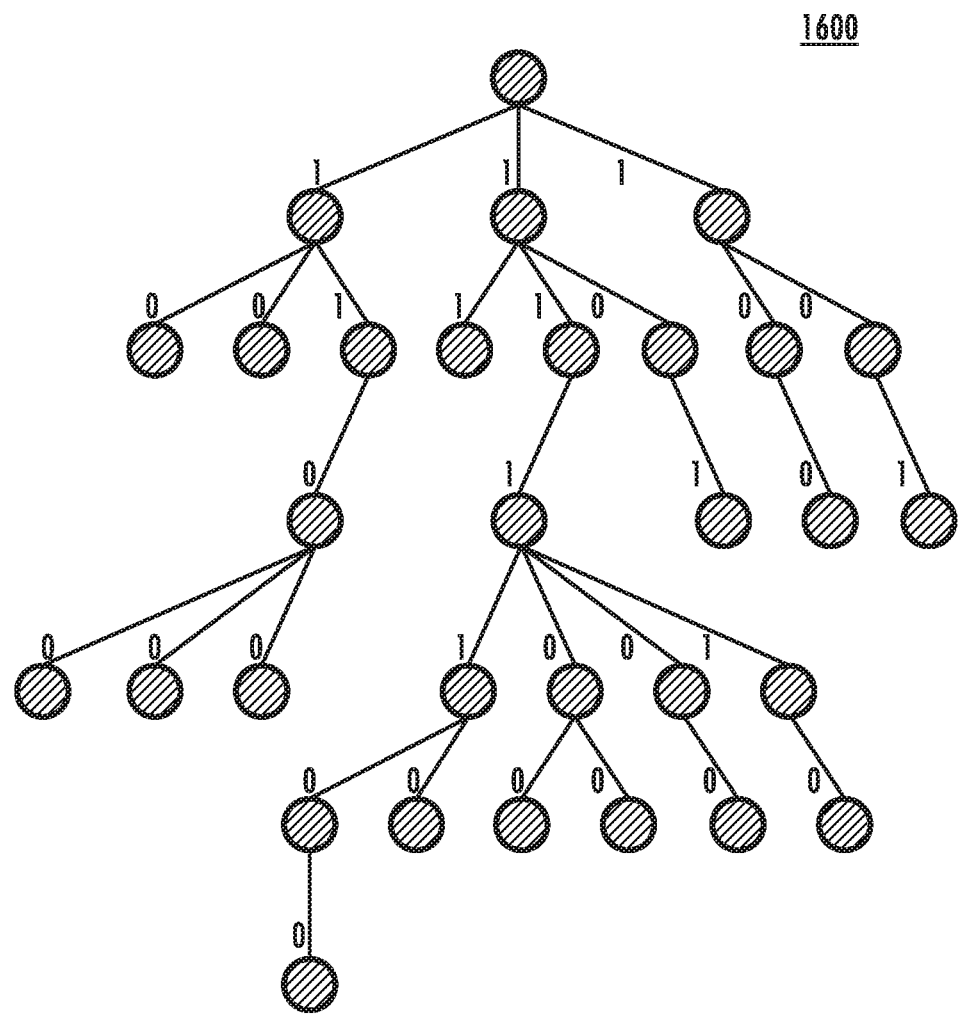

The remaining node label values comprise non-powers of two that are three or larger. These node label values are factored into one or more non-composite numerals. For such a resulting non-composite numeral factor of a node's label value, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals is illustrated in detail below. However, it should be understood that this is merely an example of an association of numerals and BELTs and that the claimed subject matter is not limited in these respects. This is illustrated, for example, in FIG. 9. The remaining edges of the tree are labeled with a binary value of one. This is illustrated in FIG. 10.

Figure 11:
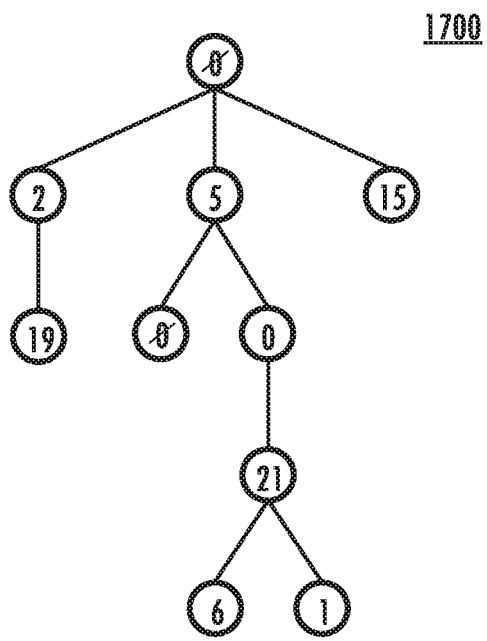
FIGS. 11-16 are schematic diagrams illustrating a process to transform a node labeled tree comprising one or more null node label values to a BELT according to an embodiment.

In another embodiment, however, a particular tree may include null types or, more particularly, some node values denoted by the empty set. This is illustrated, for example, by the tree in FIG. 11, although, of course, this is simply one example. An advantage of employing null types includes the ability to address a broader array of hierarchical data sets. For example, without loss of generality and not intending to limit the scope of the claimed subject matter in any way, a null type permits representing in a relational database, as one example, situations in which a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data.

A particular application of null node label values may be applied to a transformation of BELTs to binary node labeled trees (BNLTs). While FIGS. 2 through 4 illustrate specific examples of BELTs, it should be understood that the information expressed in a BELT may comprise essentially the same information represented in a BNLT having the same structure of corresponding nodes and edges. Here, a transformation from a BELT to a BNLT may comprise assigning node label values to nodes in the resulting BNLT the edge label values of edges in the BELT connecting corresponding nodes to their parents. The root node in the resulting BNLT may then be assigned a null label value. Similarly, a BNLT may be transformed to a BELT by assigning label values of nodes to edges connecting the nodes to corresponding parent nodes. As such, BELTs and BNLTs may comprise members of class of trees called binary labeled trees (BLTs) in which either nodes or edges hold, store and/or represent a binary label value.

Figure 12:
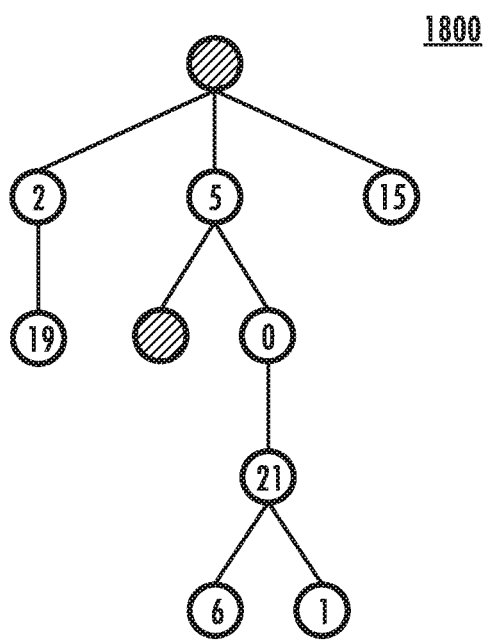

For this particular embodiment, a tree with nulls, as described above, may be transformed to a tree without nulls. This shall be illustrated, for example, for nodes labeled with a null, such as for the tree in FIG. 11; however, the claimed subject matter is not limited in scope in this respect, of course. In this particular embodiment, the nulls are deleted from those nodes having a null. This is illustrated, for example, by FIG. 12.

Figure 13:
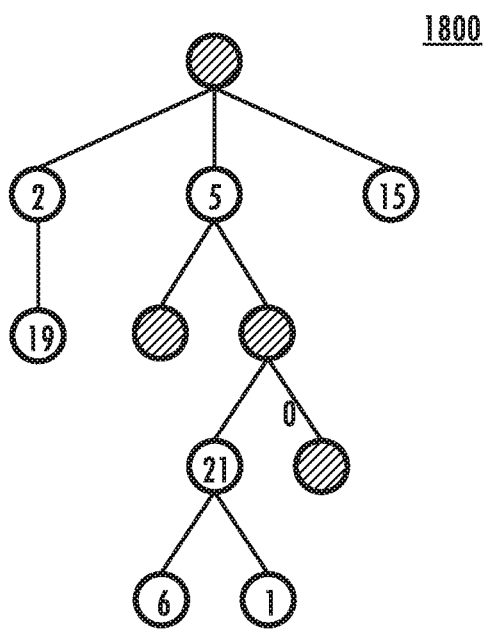
Figure 14:
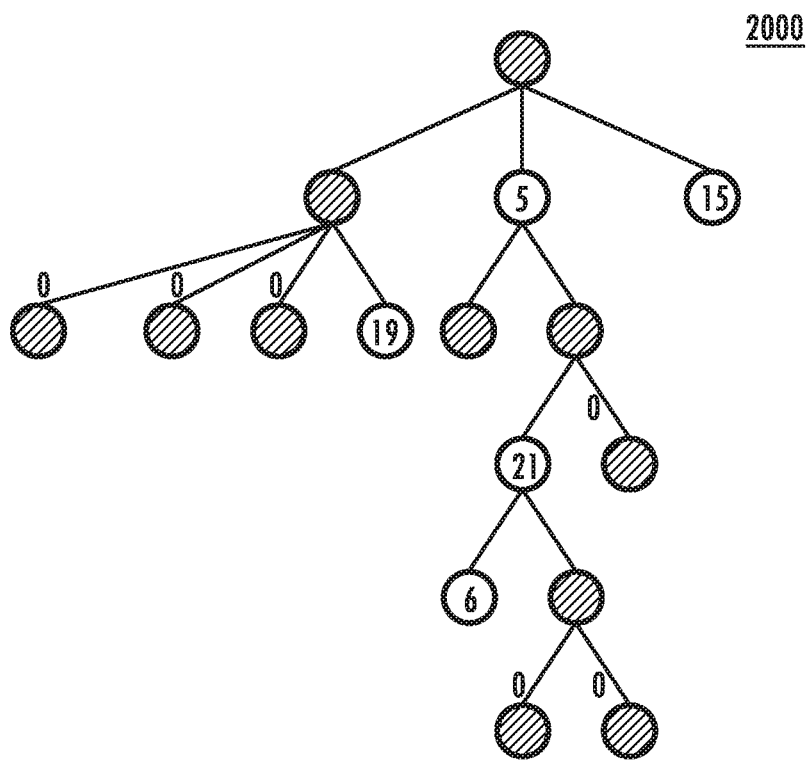

Referring now to FIG. 13, node values are also deleted for those nodes storing the value zero. Furthermore, a single new node is attached to the nodes previously storing the zero values. The edge between the prior nodes and the new nodes are labeled with a zero value. For nodes with a value k that is a power of two, including the value one, the node value is deleted and ($\log_2(k)+2$) new nodes are attached, labeling the edge between the new nodes and the old nodes with a zero value. This is illustrated, for example, in FIG. 14.

Figure 15:
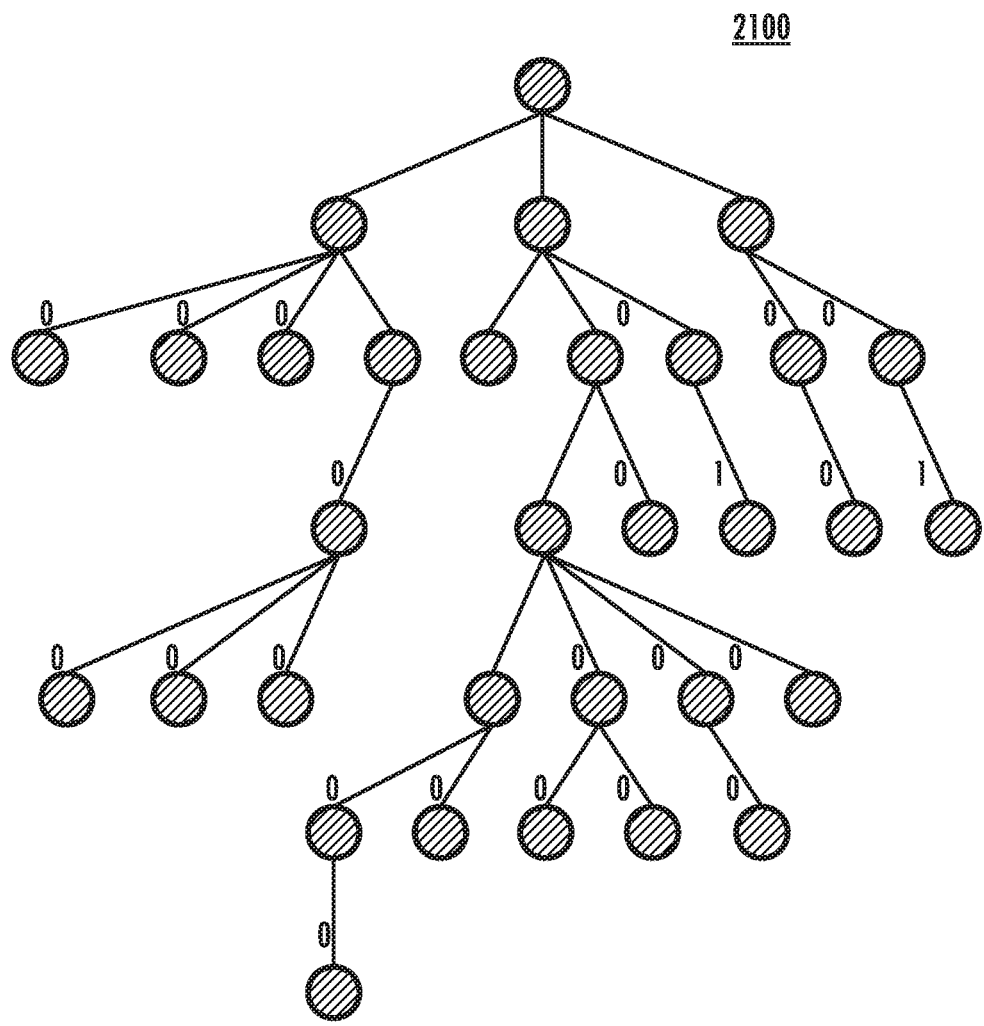
Figure 16:
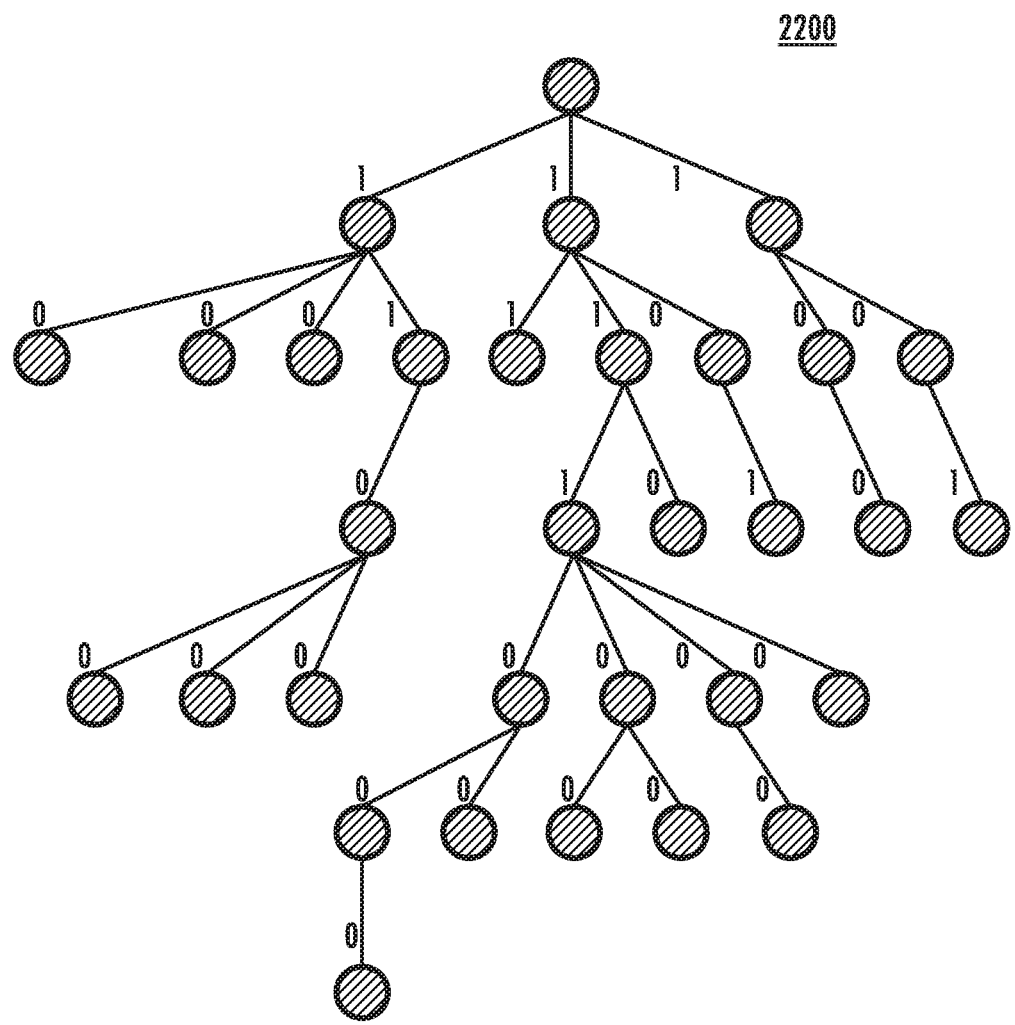
Figure 11:
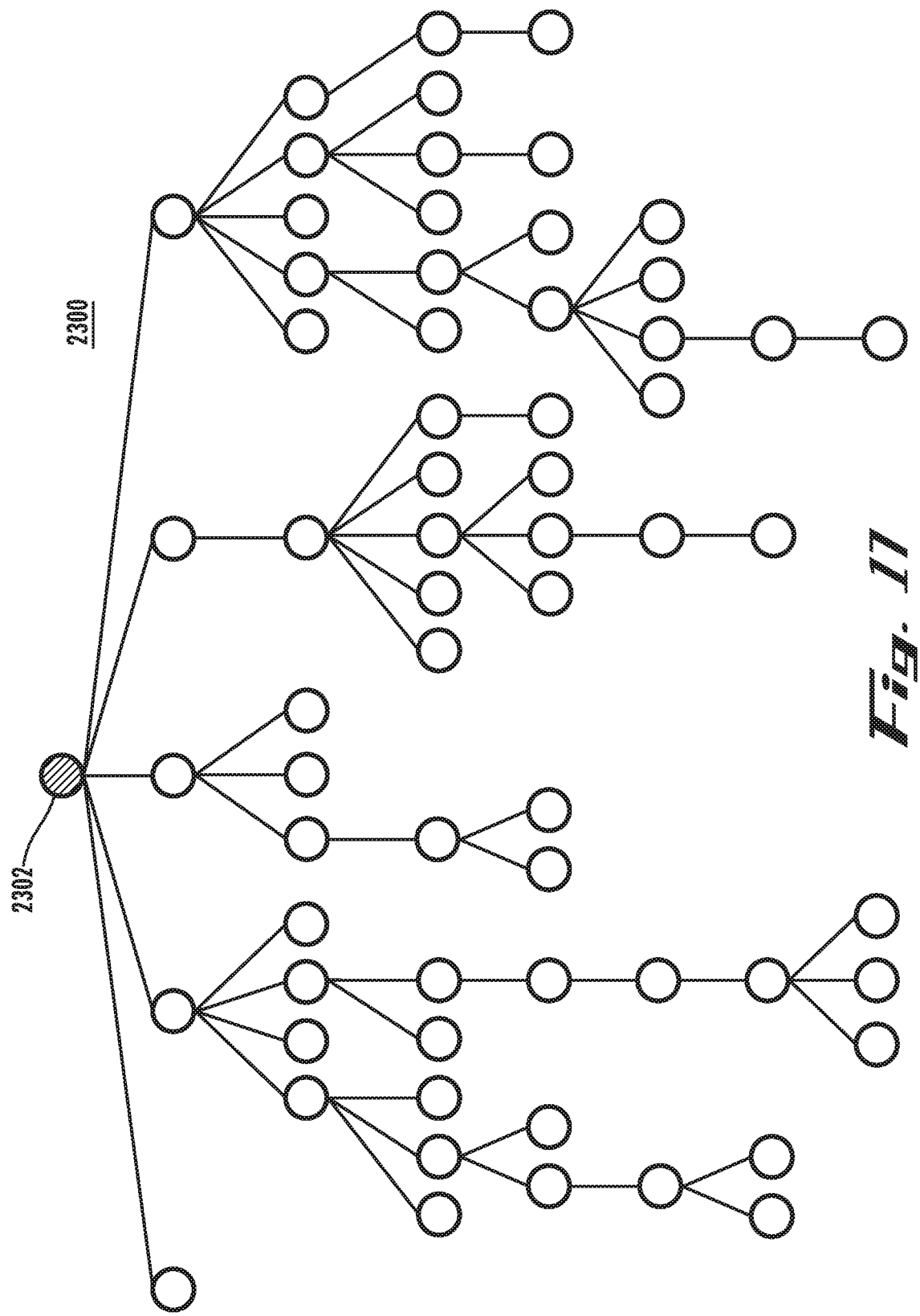

The remaining node label values comprise non-powers of two that are three or larger. These node label values are factored into one or more non-composite numerals. For such a resulting non-composite numeral factor of a node's label value, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals is illustrated in detail below. However, it should be understood that this is merely an example of an association of numerals and BELTs and that the claimed subject matter is not limited in these respects. This is illustrated, for example, in FIG. 15. The remaining edges are labeled with a binary value of one. This tree is illustrated, for example, in FIG. 16.

In an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be transformed to a binary edge labeled tree and/or binary node labeled tree, and, for another embodiment, a tree in which edges are labeled with numerals or numerical data, rather than binary data, may be transformed to a binary edge labeled tree and/or binary node labeled tree.

FIGS. 17 through 22 are schematic diagrams of trees illustrating a transformation of an unlabeled tree to a BELT according to an embodiment. This is illustrated as a sequence of operations depicted here as graph operations, although such a transformation may alternatively be implemented by operations implemented otherwise, one such example being by a computing platform, for example. Likewise, other embodiments in which trees of one form are transformed to trees of another form are also included within the scope of the claimed subject matter.

FIG. 17 is a schematic diagram of an unlabeled tree 2300 comprising a root node 2302 according to an embodiment. Identifying root node 2302 indicates a directional flow of hierarchical data represented in unlabeled tree 2300 descending away from root node. In addition to having a root node to indicate the directional flow of the hierarchical data, one or more nodes in the tree may be identified as "terminal nodes" having no children or offspring nodes. Hence, identification of the terminal nodes in a tree indicates a directional flow of hierarchical data ascending away from the terminal nodes toward a root node.

FIG. 18 is a schematic diagram of unlabeled tree 2300 showing terminal nodes as cross-hatched nodes. As illustrated from FIG. 18, a tree may comprise a single root node but multiple terminal nodes. According to an embodiment, a tree may comprise one or more nodes which are "frontier nodes." A frontier node is connected to one or more child nodes and does not have any grandchild nodes. In other words, a frontier node has at least one child node and all nodes descending from a frontier node are terminal nodes. As illustrated in FIG. 19, by way of example, according to a particular embodiment, frontier nodes 2304 in tree 2300 are connected to one or more corresponding child terminal nodes. Also, at least some of the terminal nodes are not directly connected to a frontier node.

Figure 21:
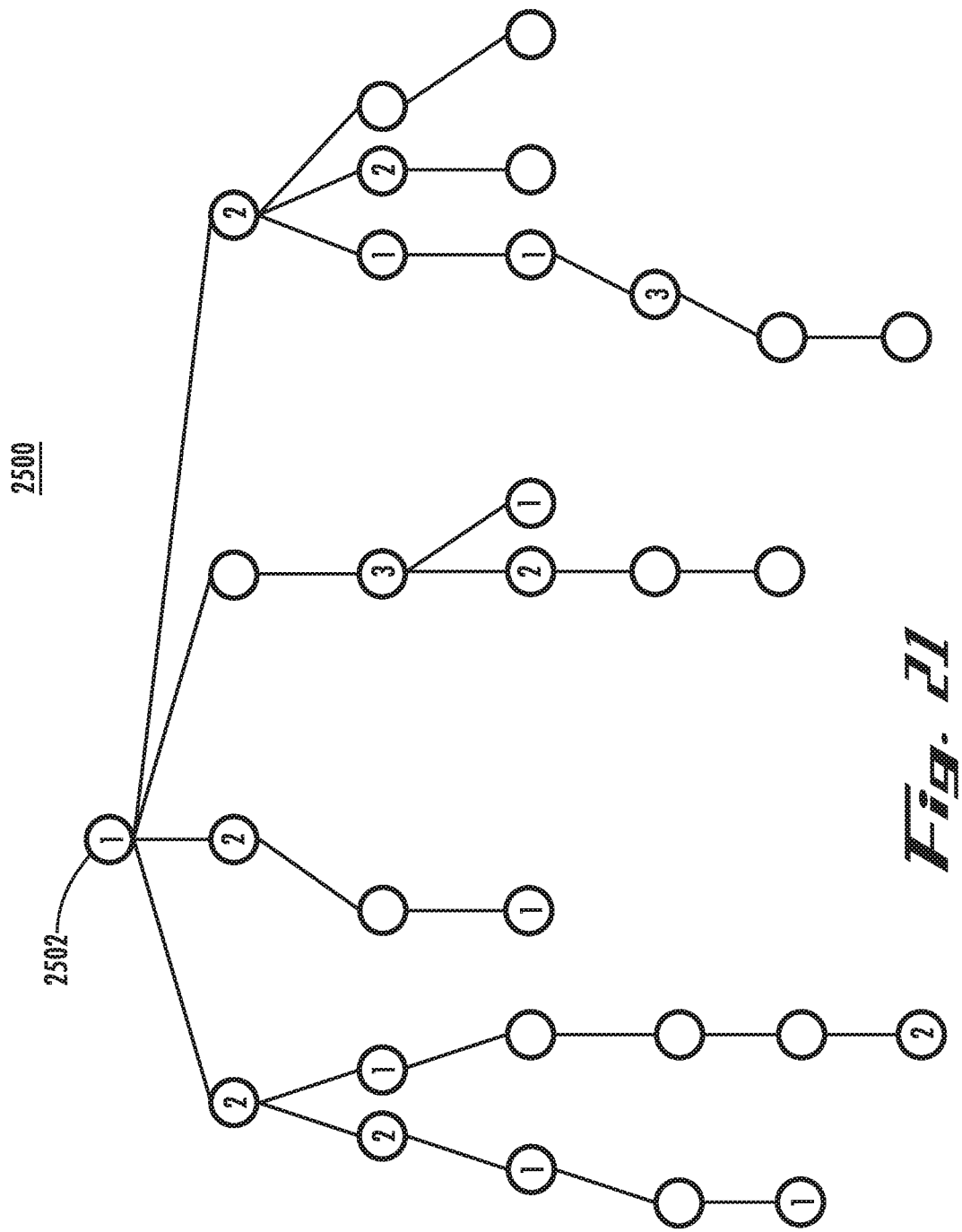
Figure 22:
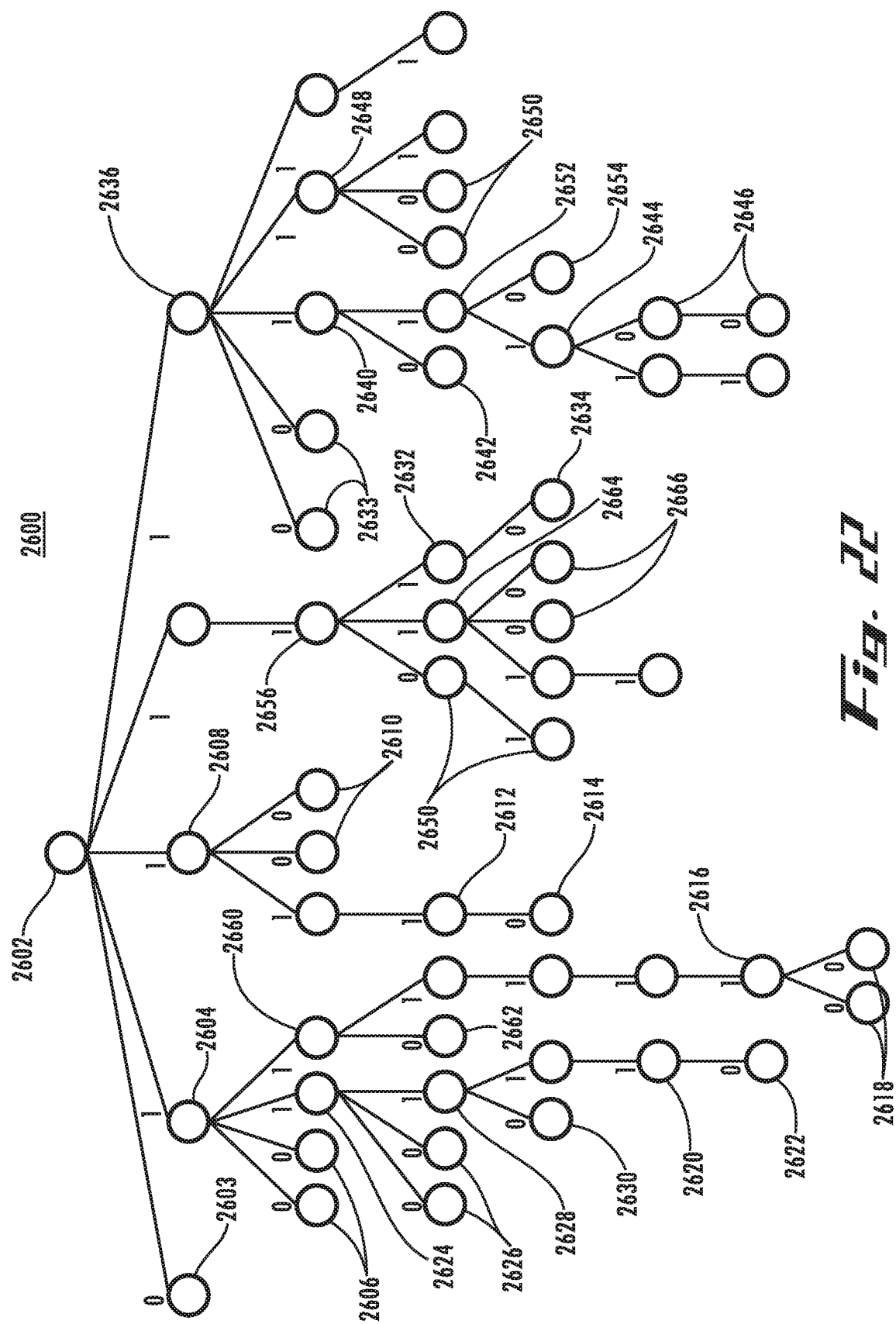

FIGS. 20 through 22 are schematic diagrams illustrating a process to transform unlabeled tree 2300 to a BELT that comprises an elementary equivalent of unlabeled tree 2300. In this particular embodiment, unlabeled tree 2300 may represent hierarchical data and the transformation illustrated below may map unlabeled tree 2300 to a BELT that represents essentially the same hierarchical data. According to an embodiment, tree 2300 is transformed to a node labeled tree 2500 shown in FIG. 21 which comprises an elementary equivalent of tree 2300. Then, as illustrated above, node labeled tree 2500 may be transformed to a BELT 2600 shown in FIG. 22 which comprises an elementary equivalent of tree 2600. Accordingly, in a particular embodiment, the resulting tree 2600 comprises an elementary equivalent of tree 2300. However, this is merely an example of how an unlabeled tree may be transformed to a BELT that is an elementary equivalent of the unlabeled tree and the claimed subject matter is not limited in this respect.

According to an embodiment, FIG. 20 illustrates a process of "pruning" terminal nodes in tree 2300 from frontier nodes. Here, tree 2400 shows darkened nodes 2404 which correspond with frontier nodes 2304 of tree 2300. According to an embodiment, tree 2400 may be generated by pruning and/or removing one terminal node connected to each of the corresponding frontier nodes 2304. The remaining terminal nodes of tree 2300 (i.e., the unpruned terminal nodes) are indicated with cross-hatching. However, this is merely an example of how terminal nodes may be pruned from corresponding frontier nodes and the claimed subject matter is not limited in this respect.

FIG. 21 is a schematic diagram of a node labeled tree 2500 which may be determined, at least in part, from tree 2400. According to an embodiment, the remaining terminal nodes of tree 2300 indicated with cross-hatching in tree 2400 are replaced with node label values associated with parent nodes in tree 2500. In a particular embodiment, for example, nodes in tree 2400 having a natural numeral k of such remaining terminal nodes as children are associated with nodes in tree 2500 having a node label value of k and the remaining terminal node children in tree 2400 are removed in the resulting tree 2500. Again, tree 2500 may represent essentially the same hierarchical data represented in tree 2400. Here, the resulting node labeled tree 2500 determined from the above described transformation may comprise an elementary equivalent of unlabeled tree 2300. However, this is merely an example how an unlabeled tree may be transformed to an elementary equivalent node labeled tree and the claimed subject matter is not limited in this respect.

Nodes in tree 2500 contain a numeral as a node label value to represent a count of remaining terminal nodes removed from corresponding nodes in tree 2400. While not shown in FIG. 21, the remaining nodes in tree 2500 not showing a node label may nevertheless be assigned a node label value of natural numeral "0." According to an embodiment, tree 2500 may be transformed to an elementary equivalent BELT by replacing nodes in tree 2500 having a non-zero node label value with an equivalent portion of a BELT. In a particular embodiment, the portion of a BELT equivalent to the non-zero node label value may be determined according to an association embodiment of numerals and trees.

Figure 23:
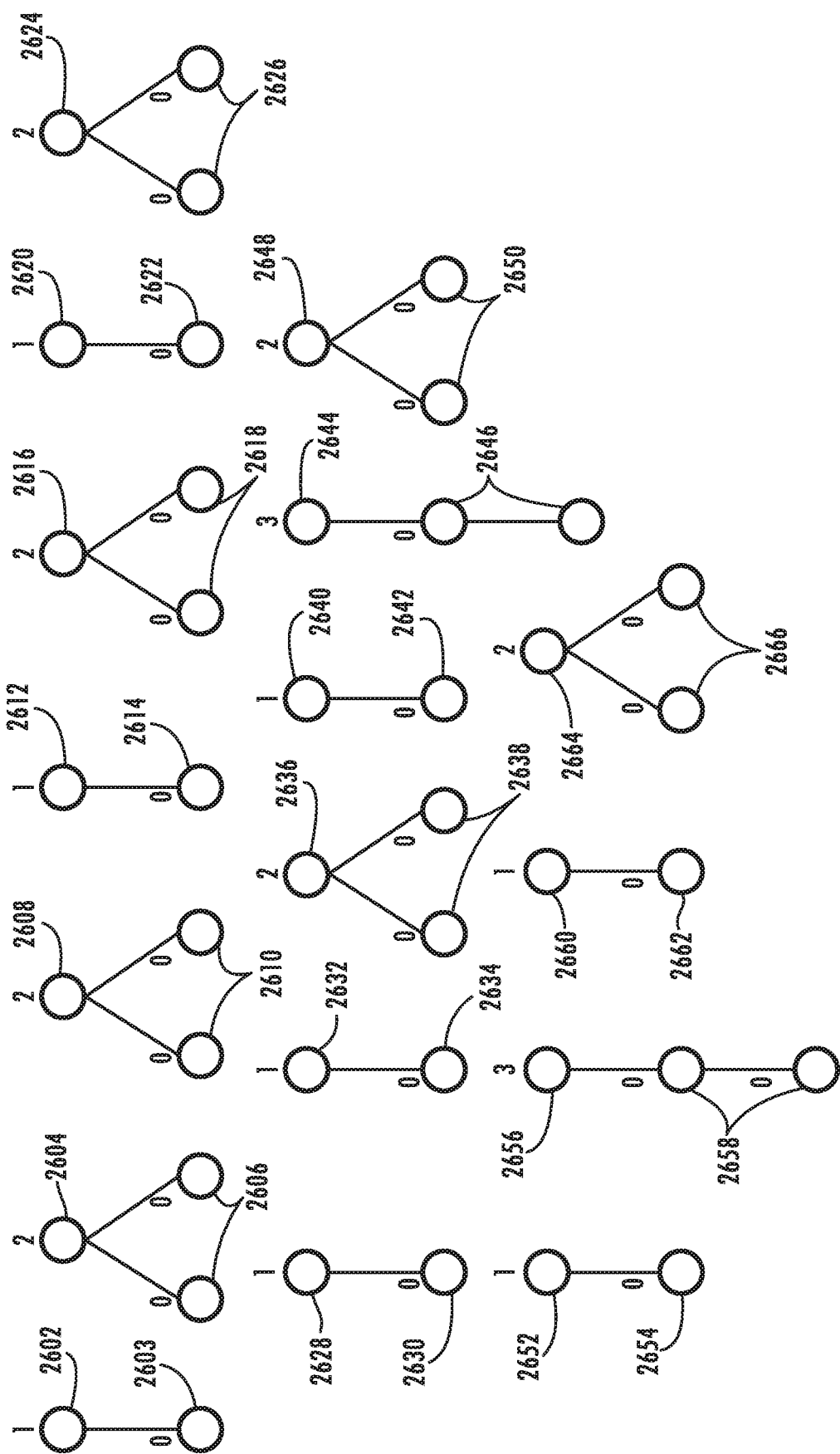
FIG. 23 is a schematic diagram associating particular node label values with portions of BELTs according to an embodiment of the BELT shown in FIG. 22.
Figure 24:
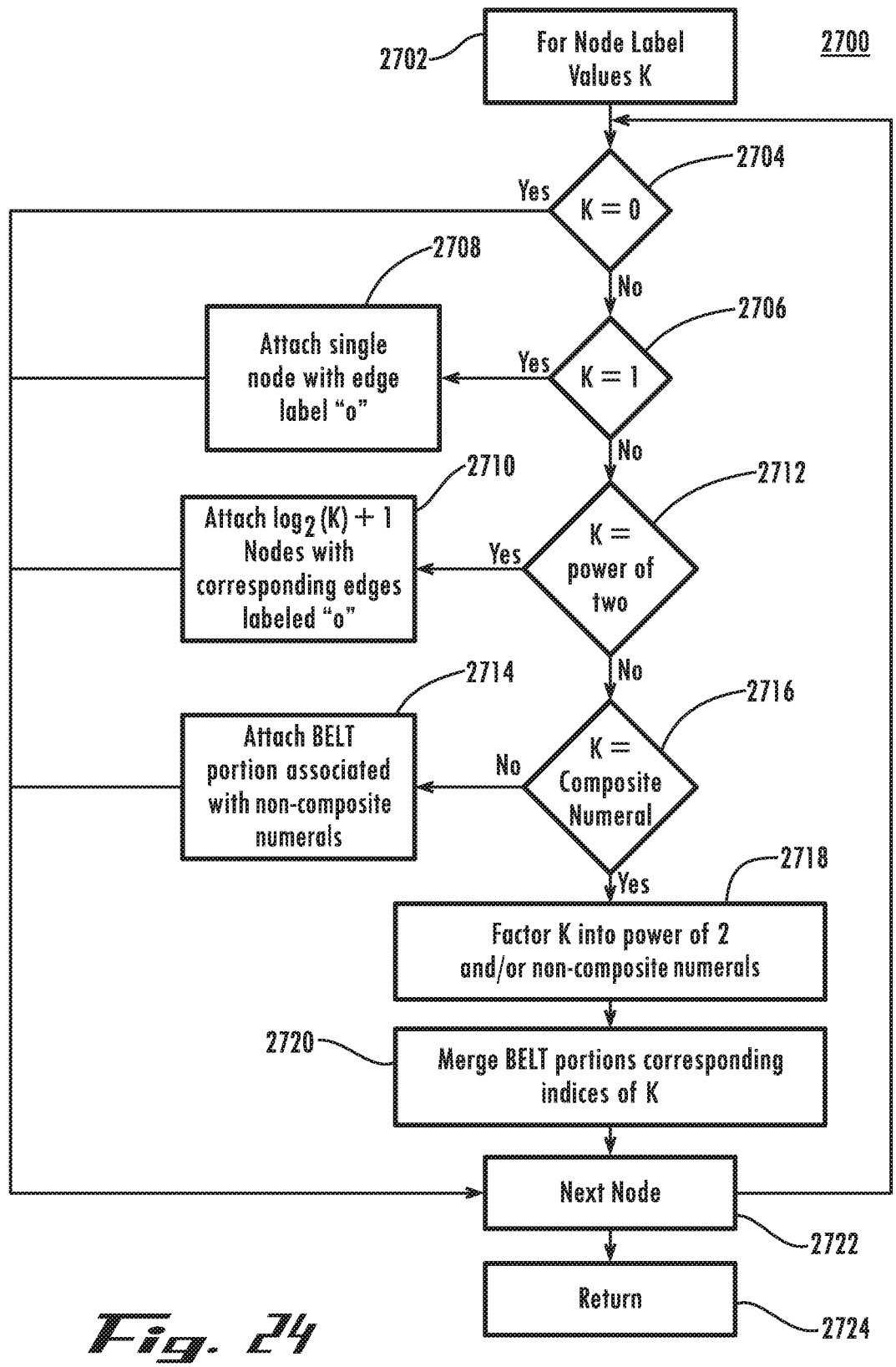

FIG. 22 is a schematic diagram of a BELT 2600 resulting from a transformation from node labeled tree 2500 according to an embodiment. According to a particular embodiment, edges in BELT 2600 corresponding with edges existing in node labeled tree 2500 may be labeled with a numeral "1." Then, nodes in BELT 2600 corresponding to nodes in node labeled tree 2500 having non-zero node label values may be connected to portions of BELTs which are based, at least in part, on the non-zero label values. Here, the non-zero node label values may be associated with the portions of BELTs according to an association of BELTs and numerals according to a particular association embodiment. In this particular embodiment, for the purpose of illustration, FIG. 23 shows portions of BELTs in BELT 2600 corresponding with a non-zero node label value in node labeled tree 2500. FIG. 23 also shows non-zero node label values in node label tree 2500 above corresponding to portions of BELTs in BELT 2600. Here, the edge between the prior nodes and the new nodes is labeled with a zero value. For nodes with a value k that is a power of two, including the value one, the node value is deleted and $(\log_2(k)+1)$ new nodes are attached, labeling the edge between the new nodes and the old nodes with a zero value.

The remaining node label values comprise non-powers of two that are 3 or larger. These node label values may be factored into one or more non-composite numerals according to a particular association embodiment. For such a resulting non-composite numeral factor of a node's label, a tag representing the non-composite numeral factor may be connected to the node by an edge having an edge label value of binary zero. The tag may comprise a portion of a BELT representing the non-composite numeral factor according to an association of BELTs and numerals of a particular association embodiment.

As described below in greater detail, the association of portions of BELTs and numerals may associate unique portions of BELTs and corresponding numerals. In other words, in a particular association embodiment, for any numerical node label value there is a unique corresponding BELT portion. Accordingly, the resulting BELT 2600 may express essentially the same hierarchical data as the node labeled tree 2500 and comprise an elementary equivalent of the node labeled tree 2500. However, it should be understood that this is merely an example of how a node labeled tree may be transformed to an elementary equivalent BELT and the claimed subject matter is not limited in these respects. Since the node labeled tree 2500 comprises an elementary equivalent of the unlabeled tree 2300, BELT 2600 may also comprise an elementary equivalent of unlabeled tree 2300. However, again, this is merely an example of a transformation of an unlabeled tree to an elementary equivalent BELT and the claimed subject matter is not limited in these respects.

Figure 24:
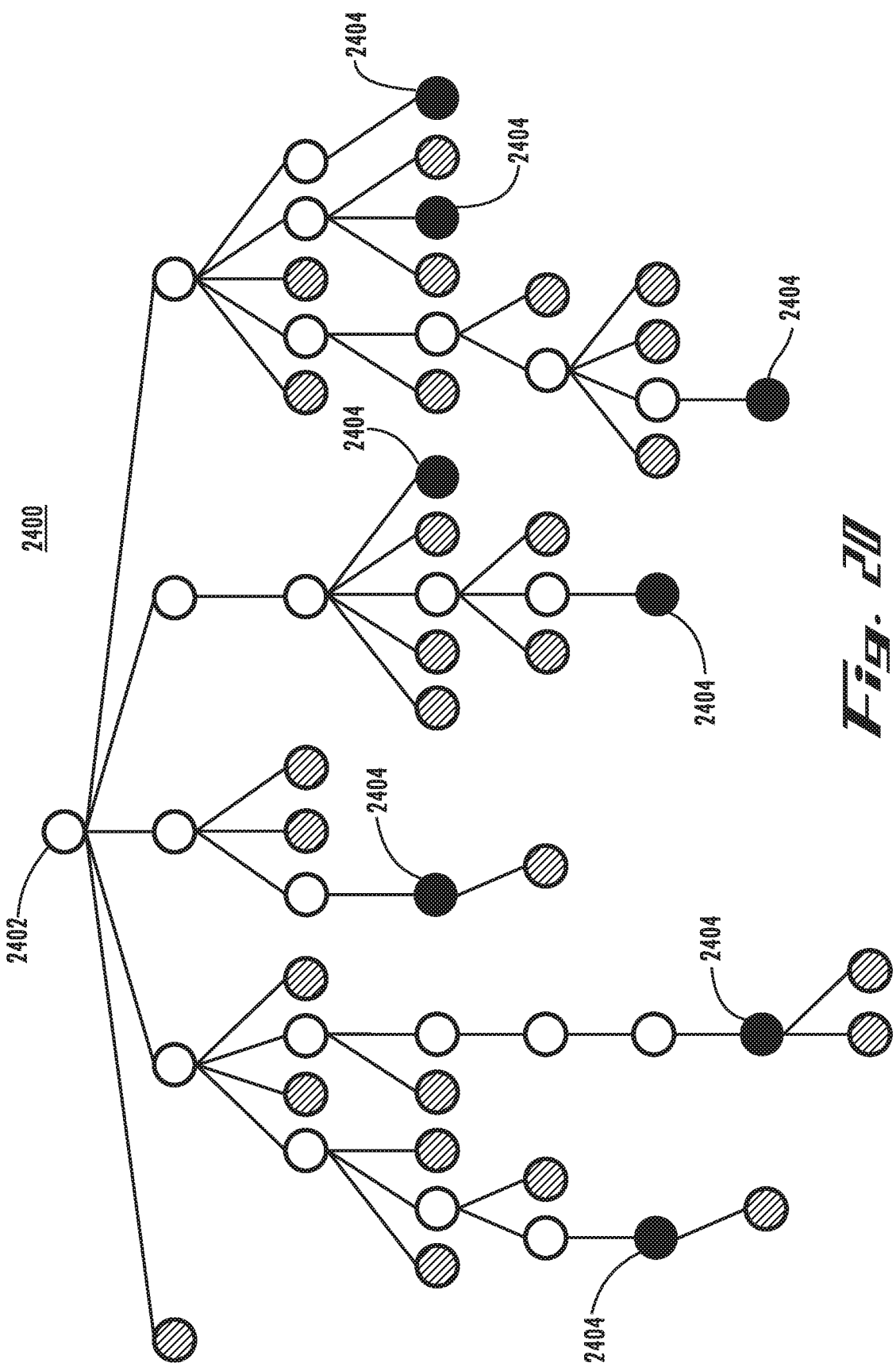
FIG. 24 is a flow diagram illustrating a process of associating node label values with BELTs and/or portions of BELTs according to an embodiment.

FIG. 24 is a flow diagram illustrating a process 2700 of associating node label values with BELTs and/or portions of BELTs according to an embodiment of the transformation illustrated above with reference to FIGS. 21 through 23. Here, process 2700 may be used to associate node label values of nodes in node labeled tree 2500 with corresponding portions of BELTs in BELT 2600, according to the particular association embodiment illustrated in FIG. 23. FIG. 25 is a table showing a particular association embodiment that may be determined according to process 2700. However, it should be understood that process 2700 and FIG. 24 merely illustrate particular association embodiments and that the claimed subject matter is not limited in these respects.

Process 2700 may determine BELT portions corresponding to node labels "k" of a node label tree, as illustrated in the transformation from node labeled tree 2500 to BELT 2600 illustrated above. If a particular node label value k is equal to zero, as determined at diamond 2704, process 2700 merely removes any node label value from a corresponding node in the resulting BELT. For a particular node label value k equal to one, as determined at diamond 2706, block 2708 may attach to a corresponding node in the resulting BELT a single node by an edge having a label value of binary zero. Such a BELT portion corresponding to numeral "1" is shown in the association embodiment of FIG. 25.

For a particular node label value k equal to a power of two, as determined at diamond 2712, block 2710 may attach to a corresponding node in the resulting BELT, $\log_2(k)+1$ nodes by corresponding edges having a label value of binary zero. This is illustrated in the particular association embodiment shown in FIG. 25 with reference to BELT portions corresponding to numerals two, four and eight. Here, two nodes are attached to the corresponding node in the resulting BELT by corresponding edges for a node label value k=2. Three nodes are attached to the corresponding node in the resulting BELT by corresponding edges for a node label value k=4; and four nodes are attached to the corresponding node in the resulting BELT by corresponding edges for a node label value k=8.

According to an embodiment, a node label value k may comprise a natural numeral that is a product of natural numerals x and y greater than one. Under this condition, k comprises a "composite numeral" capable of being factored into natural numerals x and y. Here, the BELT portion representing k in a resulting BELT may be represented as a merger of respective BELT portions represented by the natural numerals x and y at a corresponding node in the resulting BELT providing, in effect, a root node for the merged BELT portions. Alternatively, a node label value k may comprise a "non-composite" natural numeral that cannot be factored into positive natural numerals other than one and itself.

Returning to process 2700, if a node label value k comprises a non-composite natural numeral greater than three, as determined at diamond 2716, block 2714 may attach a BELT portion associated with the non-composite numeral to a corresponding node in the resulting BELT. Here, the BELT portion may be determined from a particular association of BELTs with non-composite numerals.

Returning again to process 2700, if a node label value k comprises a composite natural numeral, as determined at diamond 2716, block 2718 may first factor k by the largest power of two, "w". This factor may be represented by a BELT portion comprising $\log_2(w)$ nodes attached to the corresponding node in the resulting BELT by corresponding edges with label values "0." The remainder may then be factored into non-composite numerals greater than two. According to a particular association embodiment, as illustrated with reference to block 2714, for example, block 2718 may determine BELT portions corresponding to these non-composite factors of the remainder. Here, for such a resulting non-composite numeral factor of a node's node label, a tag representing the non-composite numeral factor may be connected to the node by an edge having an edge label value of binary zero. The tag may comprise a portion of a BELT representing the non-composite numeral factor according to an association of BELTs and numerals of a particular association embodiment. Such an association of BELTs and numerals according to one particular embodiment is illustrated in detail below.

According to a particular association embodiment, a composite numeral may be represented by individual BELTs and/or BELT portions corresponding with individual factors making up the composite numeral. Here, a "merger" operation may join the BELTs and/or BELT portions corresponding with the individual factors at a common root node to form the BELT and/or BELT portions corresponding with the composite numeral. Accordingly, such a merger operation of BELTs at a root node may correspond with multiplication of numerals corresponding with the merged BELTs. Without belaboring the discussion, such a merger operation is further illustrated in the aforementioned U.S. patent application Ser. No. 11/005,859, filed on Dec. 6, 2004, by J. J. LeTourneau, titled, "Manipulating Sets of Hierarchical Data."

Returning to process 2700, block 2720 may merge the BELT portions corresponding to these non-composite factors determined at block 2718, and any BELT portion corresponding to a power of two factor "w" of k, at the corresponding node in the resulting BELT. As illustrated in FIG. 26, by way of example, a node value of 1950 may be factored at block 2718 into non-composite numerals as follows:

$$1950 = 2 \times 3 \times 5 \times 5 \times 13$$

As may be observed from FIG. 26, according to the particular association embodiment illustrated in FIG. 25, the BELT portion corresponding to numeral 1950 comprises a merger of BELT portions corresponding to the individual non-composite factors 3, 5, 5 and 13. For the remaining factor "2," an additional node is connected by an edge having a label value of binary zero. Accordingly, it should be recognized for this particular embodiment that while block 2710 may attach $\log_2(k)+1$ nodes in the resulting BELT for a node label value power of two k, block 2720 may merge $\log_2(w)$ nodes for a power of two factor w of a composite node label value (with BELT portions representing non-composite factors greater than two).

Process 2700 should be understood to be merely illustrative of a particular process for generating BELT portions corresponding to node label values in a corresponding node labeled tree. In alternative embodiments, possible node label values may be associated in a look up table with corresponding BELT portions determined, at least in part, according to a particular association embodiment.

Regarding particular association embodiments, FIG. 25 shows that the number of nodes representing non-composite numerals may grow roughly logarithmically with respect to the corresponding non-composite numerals. Nevertheless, it should be understood that the association of non-composite numerals and BELTs as illustrated in FIG. 25 is merely an example of how non-composite numerals may be associated with BELTs in a particular embodiment, and that many other association embodiments may be used without departing from the claimed subject matter. This particular association embodiment, however, makes use of an association of BELTs and natural numerals. FIG. 27 is a table illustrating a particular embodiment of an association between natural numerals BELTs. Here, the resulting BELTs may be used as tags corresponding to non-composite node label values of nodes in a node labeled tree and/or factors thereof. As illustrated in particular embodiments above, these tags are attached to corresponding nodes in the resulting BELT by edges having a label value of binary zero (in which a tag is connected by an edge having a label value of binary zero). It should be recognized that BELTs corresponding to numerals zero and one are used to represent tags corresponding to node label values zero and one as illustrated in FIG. 25. As illustrated in FIG. 27, the tags associated with non-composite node label values and/or factors three, five, seven, eleven and thirteen correspond with the BELTs associated with numerals two, three, four, five and six, respectively. This matches the association of non-composite numerals greater than two and BELT portions shown in FIG. 25

Such an association of BELTs and numerals as illustrated may be generated by an enumeration of BELTs and associating natural numerals to such enumerated BELTs. Thus, for this particular embodiment, although the claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 27 (circle). Likewise, the one node tree, which holds no data, is associated with the one and has a graphical representation of a single node. For higher positive natural numerals, however, this embodiment of a method of enumerating a set of trees comprises positioning a tree at location k, k being a positive numeral greater than three, in which k comprises the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary zero label is not in the enumeration at some position lower than j; however, if the binary edge labeled tree obtainable from that first tree, as just described, is present in the enumeration with a binary zero label for the new edge, but not with a binary "1" label, then the tree at position j is that tree with a binary "1" label for the new edge. This may be illustrated, for example in FIG. 27, as described in more detail below.

For a particular embodiment, although the claimed subject matter is not limited in scope in this respect, a method of enumerating a set of ordered trees may begin with enumeration of an empty binary edge labeled tree and a one node binary edge labeled tree. Thus, the empty tree is associated with the zero and has a symbolic representation as illustrated in FIG. 27 (circle). Likewise, the one node tree, which holds no data, is associated with the one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment and as previously described, the empty tree has zero nodes and is associated with the zero. Likewise, the one node tree root comprises a single node and is associated with the one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

Figure 28:
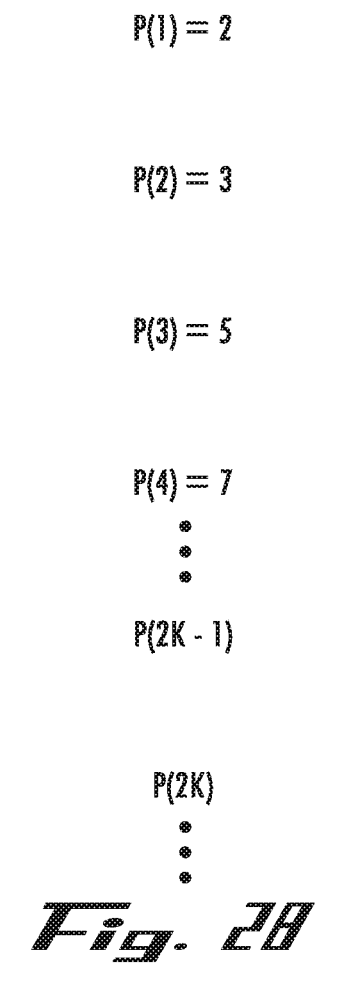

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 28. Thus, referring again to FIG. 27, the one-push of the root tree is the tree at position three. This follows from FIG. 27 since P(2*1)=P(2)=3. Likewise, the tree at position five is the zero-push of the tree at position 2. Again, this follows from FIG. 28 since P(2*2−1)=P(3)=5.

The embodiments illustrate in FIGS. 5 through 23 involve connecting tags (BELT portions representing node label values and/or factors thereof) to unlabeled nodes by edges having a label value of binary zero and assign an edge label value of binary one to the remaining edges in the resulting BELT. In alternative embodiments, however, such edges connecting tags may have a label value of binary one with the remaining edges having a label value of binary zero, although the claimed subject matter is not limited in these respects.

Also, the transformations illustrated above with reference to FIGS. 5 through 23 are particularly directed to transforming an unlabeled tree and/or a node labeled tree to a BELT. However, it should be recognized that, as a BLT may essentially be represented as either a BELT or a BNLT, such techniques illustrated herein would equally apply to the representation of hierarchical data of an unlabeled tree and/or node labeled tree in a BNLT.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store tables although, the claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that the claimed subject matter cover all such embodiments.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

What is claimed is:

1. A method of converting signal values representing one or more complex two dimensional graphical hierarchies for more convenient processing and/or storage, said one or more complex two dimensional graphical hierarchies being in the form of one or more tree hierarchies, said method comprising:
   accessing instructions from one or more physical memory devices for execution by one or more processors;
   executing said instructions accessed from said one or more physical memory devices by said one or more processors;
   storing, in at least one of said physical memory devices, signal values resulting from having executed said accessed instructions on said one or more processors, wherein said one or more physical memory devices also store a database or a portion thereof;
   wherein said accessed instructions to transform said database, or said portion thereof, to one or more complex two dimensional graphical hierarchies; and
   wherein executing said transformation instructions further comprises:
   accessing, from said one or more physical memory devices, signal values from said database to be transformed to said one or more complex two dimensional graphical hierarchies;
   transforming said signal values representing one or more labeled complex two dimensional graphical hierarchies; and
   storing said signal values representing said one or more labeled complex two dimensional graphical hierarchies, wherein said signal values before and after transformation correspond to content in said database.

2. The method of claim 1, wherein said transforming signal values representing said one or more labeled tree hierarchies further comprises:
   transforming said signal values to signal values representing one or more node labeled tree hierarchies.

3. The method of claim 1, wherein said transforming signal values representing said one or more labeled tree hierarchies further comprises:
   transforming said signal values to signal values representing one or more edge labeled tree hierarchies.

4. The method of claim 1, further comprising
   associating said signal values representing said one or more labeled tree hierarchies with corresponding tree hierarchies and/or labeled tree hierarchy portions according to an association of tree hierarchies and signal values representing numeral values.

5. The method of claim 4, further comprising
   associating said signal values representing one or more edge labeled tree hierarchies with corresponding tree hierarchies and/or labeled tree hierarchy portions according to an association of tree hierarchies and signal values representing numeral values.

6. An apparatus comprising:
   one or more processors coupled to one or more physical memory devices to store executable instructions and to store binary digital signal quantities as physical memory states, wherein the executable instructions being accessible from the one or more physical memory devices for execution by the one or more processors;
   the one or more processors able to store in at least one of the physical memory devices, binary signal quantities, if any, that are to result from execution of the instructions on the one or more processors, wherein the one or more physical memory devices also store a database or portion thereof, and wherein said accessed instructions to transform said database, or said portion thereof, to one or more complex two dimensional graphical hierarchies; and
   wherein the transformation instructions further to:
   access, from said one or more physical memory devices, signal values from said database to be transformed to said one or more complex two dimensional graphical hierarchies;
   transform said signal values representing one or more labeled complex two dimensional graphical hierarchies; and
   store said signal values representing said one or more labeled complex two dimensional graphical hierarchies, wherein said signal values before and after transformation correspond to content in said database.

7. The apparatus of claim 6, wherein the transformation instructions to transform said signal values further to transform signal values representing one or more labeled tree hierarchies to one or more node labeled tree hierarchies.

8. The apparatus of claim 6, wherein the transformation instructions to transform said signal values further to transform signal values representing one or more labeled tree hierarchies to one or more edge labeled tree hierarchies.

9. The apparatus of claim 6, wherein the transformation instructions to
   associate said signal values representing said one or more labeled tree hierarchies with corresponding tree hierarchies and/or labeled tree hierarchy portions according to an association of tree hierarchies and signal values representing numeral values.

10. An article comprising: a non-transitory storage medium including executable instructions stored thereon; wherein the instructions are executable by one or more processors to be coupled to one or more physical memory devices, the devices to store instructions, including the executable instructions, and to store binary digital signal quantities as physical memory states, wherein the executable instructions to be accessible from the one or more physical memory devices for execution by the one or more processors; and the one or more processors able to store in at least one of the physical memory devices, binary signal quantities, if any, that are to result from execution of the instructions on the one or more processors, wherein the one or more physical memory devices also store a database or portion thereof, and wherein said accessed instructions to transform said database, or said portion thereof, to one or more complex two dimensional graphical hierarchies;

wherein the transformation instructions further to:

access, from said one or more physical memory devices, signal values from said database to be transformed to said one or more complex two dimensional graphical hierarchies;

transform said signal values representing one or more labeled complex two dimensional graphical hierarchies; and store said signal values representing said one or more labeled complex two dimensional graphical hierarchies, wherein said signal values before and after transformation correspond to content in said database.

11. The article of claim 10, wherein the transformation instructions to transform said signal values further to transform signal values representing one or more labeled tree hierarchies to one or more node labeled tree hierarchies.

12. The article of claim 10, wherein the transformation instructions to transform said signal values further to transform signal values representing one or more labeled tree hierarchies to one or more edge labeled tree hierarchies.

13. The article of claim 10, wherein the transformation instructions to associate said signal values representing said labeled tree hierarchies with corresponding tree hierarchies and/or labeled tree hierarchy portions according to an association of tree hierarchies and signal values representing numeral values.

* * * * *